US005113218A

United States Patent [19]

Morikawa et al.

[11] Patent Number: 5,113,218

[45] Date of Patent: May 12, 1992

[54] ELECTROPHOTOGRAPHIC MACHINE WITH CONTROL MEANS RESPONSIVE TO SET MAGNIFICATION RATIO AND FOCAL LENGTH

[75] Inventors: Takeshi Morikawa, Toyokawa; Shinya Matsuda, Kyoto, both of Japan

[73] Assignee: Minolta Camera Kabushiki Kaisha, Osaka, Japan

[21] Appl. No.: 624,330

[22] Filed: Dec. 4, 1990

[30] Foreign Application Priority Data

Dec. 4, 1989 [JP] Japan .................................. 1-315579
Dec. 4, 1989 [JP] Japan .................................. 1-315580

[51] Int. Cl.[5] ............................................ G03B 27/34

[52] U.S. Cl. ........................................ 355/56; 355/55; 355/243

[58] Field of Search ............... 355/243, 232, 228, 210, 355/55, 56, 61, 57; 359/212

[56] References Cited

U.S. PATENT DOCUMENTS

Re. 32,424 5/1987 Takenaka et al. .................... 355/55
4,501,490 2/1985 Miyamoto et al. .................. 355/55
4,571,061 2/1986 Osanai et al. .
4,676,631 4/1987 Kosugi et al. ......................... 355/55
4,922,087 5/1990 Nakajima et al. ............... 355/56 X
4,925,736 10/1991 Ikeda .................................... 355/57

*Primary Examiner*—A. T. Grimley
*Assistant Examiner*—Sandra L. Brasé
*Attorney, Agent, or Firm*—Price, Gess & Ubell

[57] ABSTRACT

Disclosed is a copying machine employing a uni-focus projection lens in which the lens and a mirror for changing the conjugates length are driven to move independently according to a set magnification ratio and the focal length of the lens. Either the lens or the mirror is moved by a stepping motor according to a set first magnification ratio and the focal length of the lens. Calculated from the travel of either the lens of the mirror is a second magnification ratio, and the other one of the mirror and the lens is moved according to the second magnification ratio. In another way, first the lens is moved according to the set magnification ratio and the focal length of the lens. Calculated from the travel of the lens is the theoretical conjugate length at the set magnification ratio, and the mirror is moved according to the theoretical conjugate length. In another way, first the mirror is moved according to the set magnification ratio and the focal length of the lens. Calculated from the travel of the mirror is the theoretical lens forward length at the set magnification ratio, and the lens is move according to the theoretical lens forward length.

17 Claims, 21 Drawing Sheets

ELECTROPHOTOGRAPHIC MACHINE WITH CONTROL MEANS RESPONSIVE TO SET MAGNIFICATION RATIO AND FOCAL LENGTH

BACKGROUND OF THE INVENTION

1. Field of the Invention

The present invention relates to an electrophotographic machine, and more particularly to an electrophotographic machine wherein an original image is projected on a photosensitive medium at a predetermined magnification ratio so that a magnified or reduced copy is obtained.

2. Description of Related Art

Generally, in an electrophotographic machine having an optical system employing a uni-focus lens as a projection lens, it is necessary for a change in magnification not only to more the lens to a certain position to adjust the magnification in the direction perpendicular to the scanning direction (widthwise direction) but also to move the reflection member (mirror) to a certain position in accordance with the conjugate length. Conventionally, a stepping motor has been usually user as a common drive power source for the above-described movements of the lens and the reflection member, and a cam has been used for adjusting the travels of the lens and the reflection member. In more detail, a stepping motor is rotated at a certain angle to move the lens according to a magnification ratio, and a cam linked to a rotary force transmission mechanism provided for the stepping motor moves the reflection member.

In practice, uni-focus lenses even in the same production line have their respective own characteristics due to errors in assembly and vary in focal length in a certain range. Since the lens is directly driven by the stepping motor, it is possible to control the movement of the lens in accordance with its focal length. In order to control the movement of the reflection member in accordance with the focal length o the lens, it is necessary to design an prepare a cam having a special configuration corresponding with the focal length of the lens. However, cams for a gel are produce only in a limited number of kinds in order to avoid any increase in production cost attributed to possible complication of control data an increase of parts in kin. Hence, in reality, it is impossible to control the movement of the reflection member in accordance with the focal length of the lens. When a cam an a cam follower are used, a significant amount of toque loss will take place, and the load on the motor will increase.

There is another problem in changing magnification is that the mutual adjustment between focus an magnification is complicated. When it is detected that the lens an the reflection member are set well as regards to focus but poorly as regards to magnification, the lens should be move, which movement causes a movement of the reflection member, an the focus will be lost. It is therefore necessary to repeat the above-mentioned operation until correct focus an magnification are obtained, which is a complicated procedure.

To eliminate the above problems, there is a scheme of driving the projection lens and the reflection member independently with separate stepping motors. In this case, however, since the smallest unit of the travels of the projection lens an the reflection member is one step of the respective motors, there will be errors in moving the lens and the reflection member by at most a half of the amount corresponding to one step of the respective motors. The above-mentioned errors deteriorate the optical accuracy in focus an magnification.

SUMMARY OF THE INVENTION

It is therefore an object of the present invention to provide an electrophotographic machine having an optical system in which positioning of a lens an a reflection member to change magnification is performed accurately in consideration of the error of the projection lens in focal length and in a simple procedure.

In order to achieve the object, an electrophotographic machine according to the present invention comprises a movable reflection member for forming an optical projection path to project an original image on a photosensitive medium, a uni-focus projection lens movable in the optical projection path fore by the reflection member, first drive means for moving the projection lens second drive means for moving the reflection member, an control means for independently moving the first drive means an the second drive means in accordance with a set magnification ratio an the focal length of the projection lens.

In the construction, the error in the focal length of the lens is figure out beforehand, and the travels of the lens an the reflection member to change the magnification to a set value are calculate taking the error of the lens in focal length into accent. According to the thus calculate values, the lens an the reflection member are move independently to the most appropriate positions for a set magnification ratio. The movement of a reflection member, which has been conventionally driven by a following the movement of a projection lens, according to the present invention, can be controlled independently of the movement of the projection lens, whereby accuracy in changing the conjugate length is significantly improved.

Slight errors in moving the projection lens an the reflection member are cause by using stepping motors. In the present invention, either an error in moving the projection lens or a error in moving the reflection member is corrected before a movement of the other in order either to focus or to obtain accurate magnification so that more accurate performance of the optical system is achieve.

In focusing prior to obtaining accurate magnification, the projection lens is move to focus at a magnification ratio set an operator, an the reflection lens is move in accordance with a secondary value of magnification calculate from the actual travel of the projection lens. In another way, the reflection member is move in accordance with the magnification ratio set by the operator, an the projection lens is move to focus in a secondary value of magnification calculate from the actual travel of the reflection lens.

In obtaining accurate magnification prior to focusing, the projection lens is moved to focus at a magnification ratio set an operator, and the reflection member is move in accordance with a theoretical conjugate length at the magnification ratio, which conjugate length is calculate from the actual travel of the projection lens. another way, the reflection member is move in accordance with the magnification ratio set by an operator, an the projection lens is move in accordance with a theoretical lens forward length at the magnification ratio, which lens forward length is calculated from the actual travel of the reflection member.

BRIEF DESCRIPTION OF THE DRAWINGS

These an other objects an features of the present invention will become apparent from the following description taken in conjunction with the preferred embodiments thereof with reference to the accompanying drawings, in which:

FIG. 1 through 13 show a first embodiment according to the present invention;

FIG. 1 is a schematic view of a copying machine;

FIG. 2 is a perspective view of a drive mechanism for driving a projection lens an mirrors;

FIG. 3 is a look diagram of an optical system control circuit;

FIG. 4 is a look diagram of a motor driving circuit:

FIG. 6 is a view of the mirrors showing the movements;

FIG. 7 is a flowchart of a main routine of a microcomputer for controlling the optical system;

FIG. 9 is a flowchart of a subroutine for moving the lens performed in the subroutine shown in FIGS. *a* through 8*e;*

FIG. 10 is a flowchart of a subroutine for moving the mirrors performed in the subroutine shown in FIGS. 8*a* through 8*e;*

FIG. 11 is a flowchart of a subroutine for interrupting the timer performed in the subroutine shown in FIGS. 8*a* through 8*e;*

FIG. 12 is a flowchart of a subroutine for stopping the movements of the lens an the mirrors performed in the subroutine shown in FIGS. 8*a* through 8*e* an FIG. 11;

FIG. 13 is a perspective view of a modified drive mechanism for the lens an the mirrors;

DETAILED DESCRIPTION OF THE PREFERRED EMBODIMENTS

The following describes exemplary copying machines embodying the principles an features of the present invention in reference with the accompanying drawings.

First Embodiment: FIGS. 1 through 13

Figure 1:
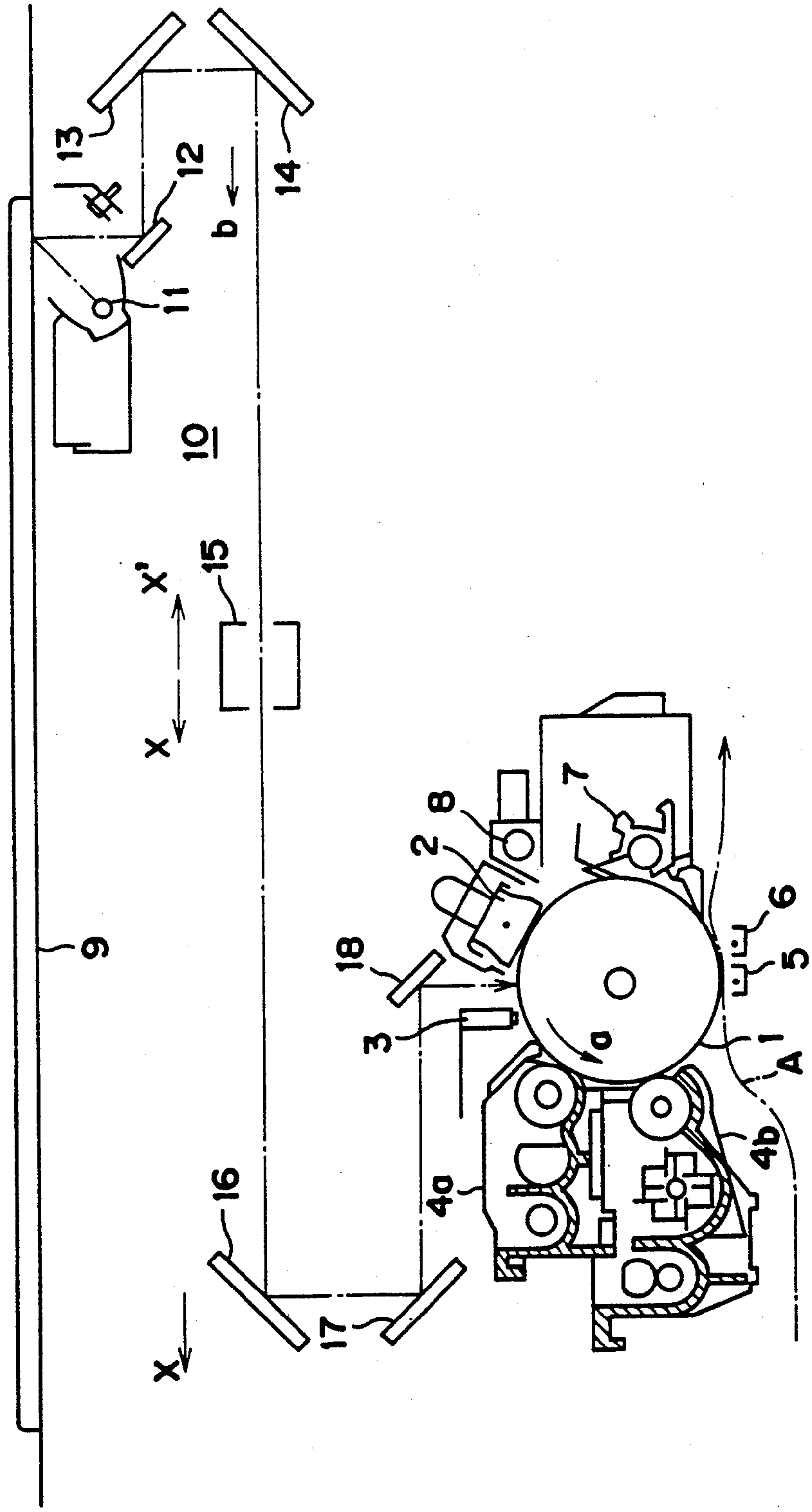

FIG. 1 is a schematic view of a coping machine having a fixed original tale an a moving optical system. A photosensitive drum 1 can be driven to rotate in the direction indicate by the arrow (a), around which are provided an electrostatic charger 2, an image interval/-age eraser lamp 3, magnetic rush type developing units 4*a* an 4*b*, an image transfer charger 5, a sheet separating charger 6, a remaining toner cleaning unit 7, an a remaining electrostatic eraser lamp 8. A copy sheet is supplied from the left in FIG. 1, an transferred in the path as indicated by the chain line. After an image transfer process, the sheet is ejected from the machine by way of an image fixing unit (not shown). Since the construction and operation of each image forming unit are well known, no detailed description of them is provide here.

An optical system 10 is provide below a original tale 9, an the optical system 10 comprises an exposure lamp 11, a first mirror 12, a second mirror 13, a third mirror 14, a uni-focus projection lens 15, a fourth mirror 16, a fifth mirror 17 an a sixth mirror 18. An original put on the original tale 9 is expose to light from the exposure lamp 11, an the light reflected on the original is focused on the photosensitive drum 1 by of the mirrors 12, 13 an 14, the lens 15, and the mirrors 16, 17 and 18. The exposure lamp 11 a the first mirror 12 are integrate in a unit, while the second an the third mirrors 13 an 14 are integrate in another unit. These units move in the direction indicate by the arrow (b) in FIG. 1 to scan the original. At this time, the exposure lamp 11 an the first mirror 12 are driven to move at a speed of v/m (v: peripheral speed of the rum 1, m: magnification ratio), while the second an the third mirrors 13 an 14 are driven to move at a speed of v/2. Because the ratio of the speeds of the two units is two to one, the optical path length between the original surface an the projection lens 15 is constant during a scan of the original.

FIG. 1 illustrates the positions of the lens 15 an the fourth an the fifth mirrors 16 an 17 when a magnification ratio is "1". In order to perform a copying operation at a magnification ratio other than "1", the lens 15 is require to move in either the direction of or the direction of X', an the fourth an the fifth mirrors 16 an 17 are required to move in the direction of X. Supposing that the magnification ratio is "m" an the focal length of the lens 15 is "f", the lens frowardlength L1 (optical path length between the original surface an the lens 15) an the conjugate length L2 (optical path length between the original surface an the surface of the photosensitive drum 1) can be expressed by the following equations (1) and (2):

$$L1=(1+1/m)\times f \tag{1}$$

$$L2=(2+m+1/m)\times f \tag{2}$$

As obvious from the equations (1) and (2), the lens forward length L1 an the conjugate length L2 vary in accordance with the focal length "f" of the lens 15. Since each lens has its own focal length, the values L1 an L2 at a magnification ratio vary from machine to machine even in the same model, an therefore it is necessary to control the movements of the lens 15 an the mirrors 16 an 17 differently from machine to machine. Conventionally, lenses are preliminarily sorted into several groups, each of which has a certain range, according to the focal length, an the travel of the lens 15 for a change in magnification an the configuration of a cam for moving the mirrors 16 an4 17 are determine opening on which group the lens 15 belongs to. In this embodiment, the lens 15, an the mirrors 16 an 17 are driven by a stepping motor M1 an a stepping motor M2 respectively.

Figure 2:
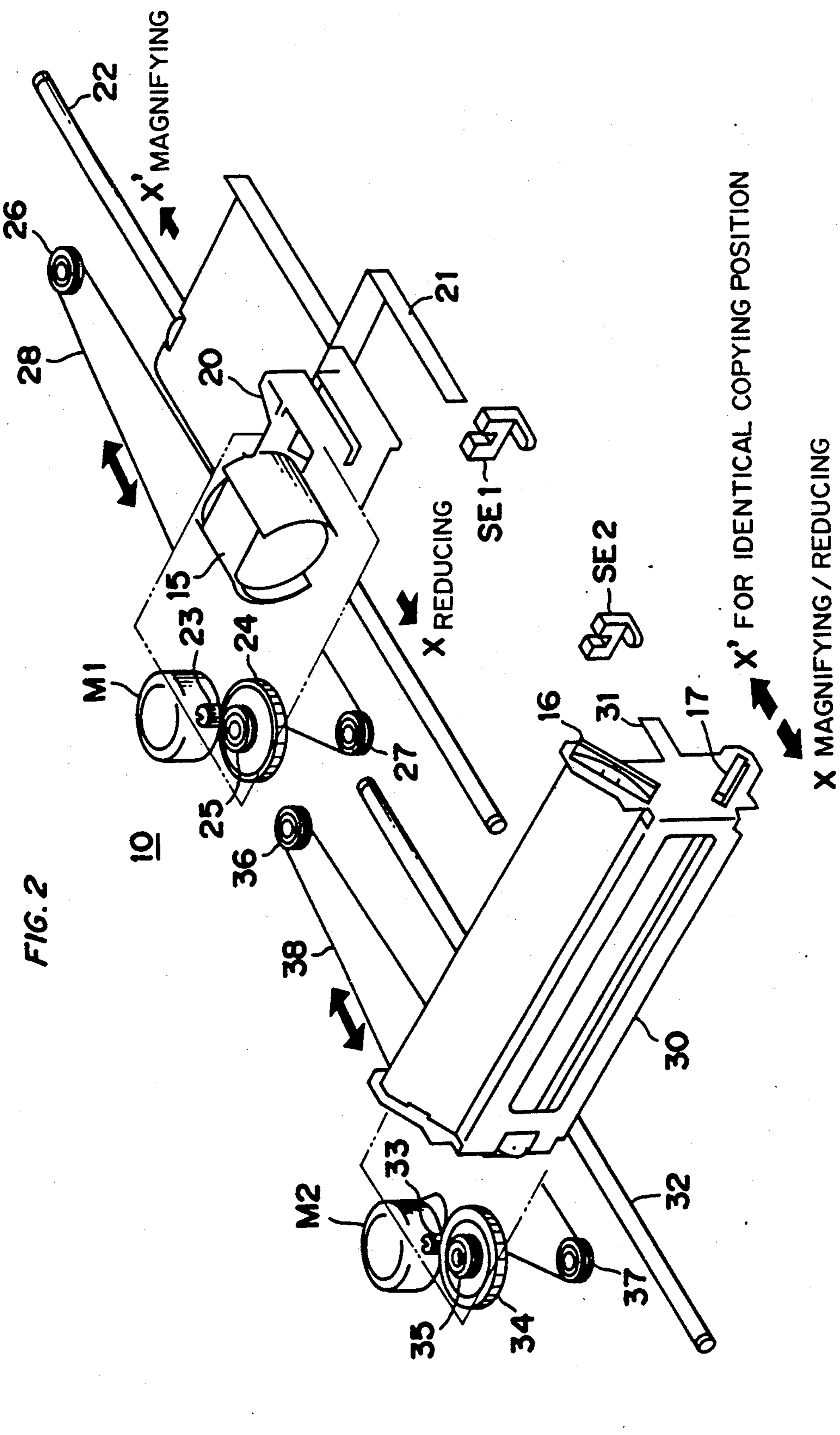

Referring to FIG. 2, the projection lens 15 is mounted on a rail 22 via a frame 20 an made movable in the directions indicate by the arrows X and X'. An output gear 23 provide for the stepping motor M1 is engage with an idle gear 24. A wire 28 is laid among a pulley 25 fixed coaxially to the idle gear 24, a pulley 26 an a pulley 27, an a part of the wire 28 is fixed to the frame 20. A sensor SE1 which is turned on an off by a protrusion 21 is provide on the frame 20 to detect whether the lens 15 is at the home position. The mirrors 16 an 17 are provided on a rail 32 via a frame 30 movably in the directions indicate by the arrows X an X'. A drive unit for the mirrors 16 an 17 has the same construction as that for the lens 15, an the drive unit comprises the stepping motor M2, an output gear 33, a gear 34, pulleys 35, 36 an 37, an a wire 38. sensor SE2 for detecting whether the mirrors 16 an 17 are at the home position is turned on an off by a protrusion 31 impose on the frame 30.

Figure 3:
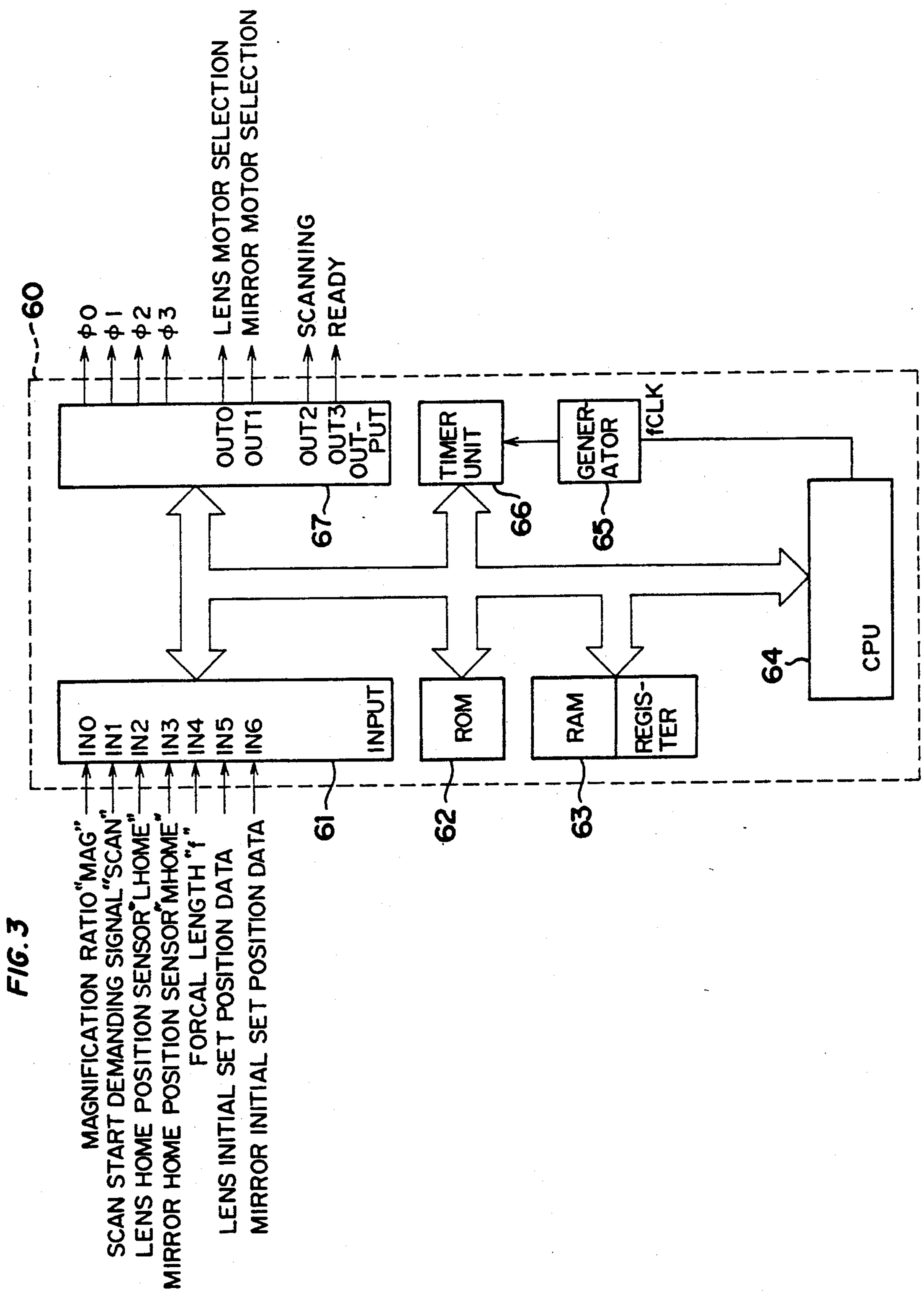

FIG. 3 is a look diagram showing control circuitry of a microcomputer 60 for controlling the optical system 10 having the above-mentioned construction. The microcomputer 60 receives signals from a master microcomputer (not shown) for controlling all the units of the copying machine except for the optical system 10, that is, controlling the operation panel, the image forming unit an the sheet feeding unit, an the microcomputer 60 controls the events of the lens 15 an the mirrors 16 an 17 acooringly.

The microcomputer 60 comprises an input port 61, an ROM 62, an RM, a register 63, a control processing unit 64, a generator 65 for generating a clock signal f CL, a timer nit 66 an an output port 67. Input to the input port 61 are a signal transmitted from the master microcomputer representing a magnification ratio MG set by an operator, a signal SC meaning the optical system 10 to start a scan, data on the focal legth "f" of the lens 15, data for moving the lens 15 to an initial set position, data for moving the mirrors 16 and 17 to an initial set position, a signal LHOME transmitted from the lens home position sensor SE1 an a signal MHOME transmitted from the mirror home position sensor SE2. Output from the output port 67 are signals φ0, φ1, φ2 and φ3, a lens motor selection signal, a mirror motor selection signal, scan signals for controlling an image scan by the optical system 10, a signal READY informing the master microcomputer of the completion of positioning of the lens 15 an the mirrors 16 and 17 which is required in cases of turning on the machine an changing the magnification.

Figure 4:
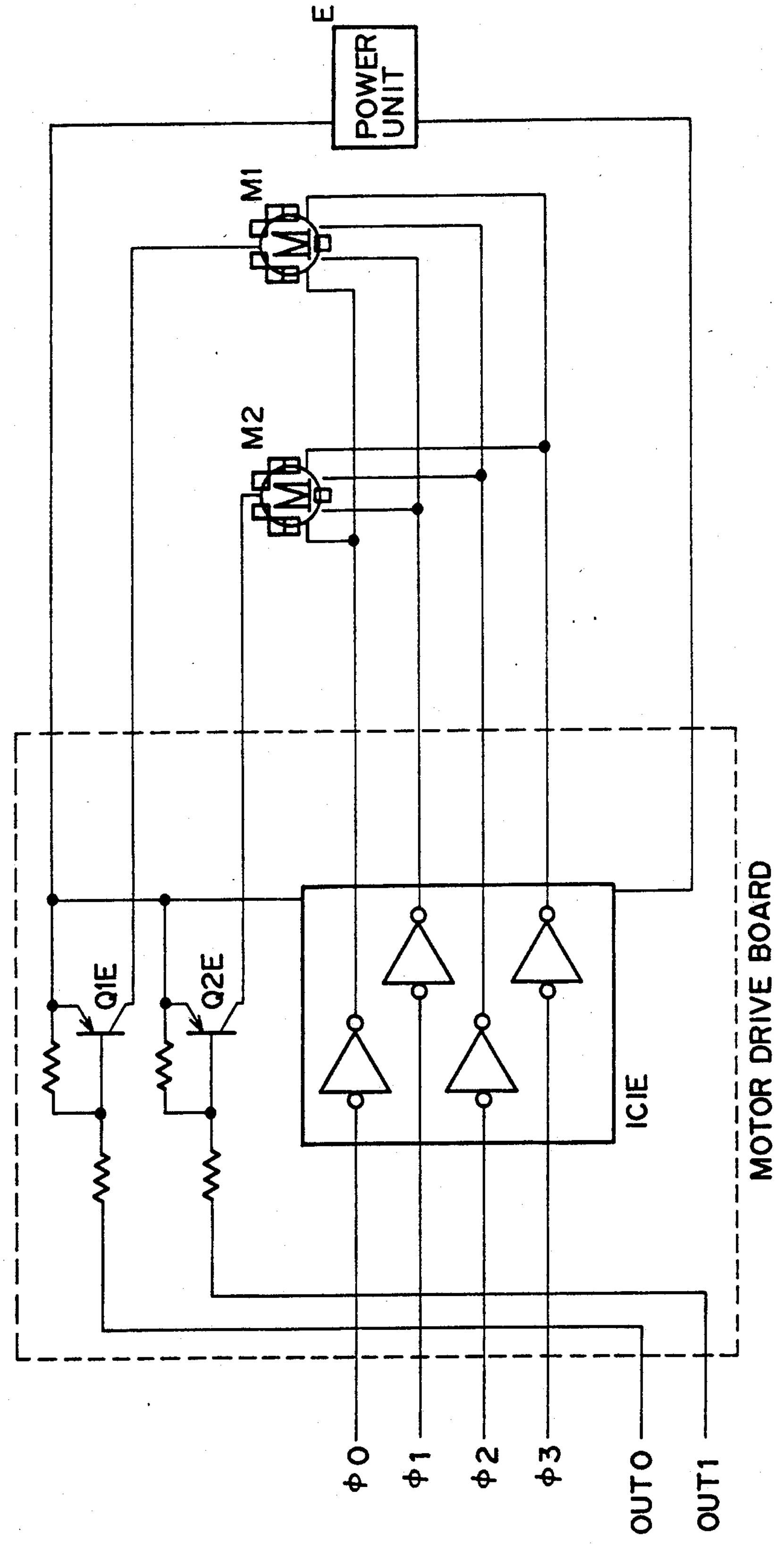

FIG. 4 shows a drive circuit of the stepping motors M1 an M2. Input terminals of transistors Q1E an Q2E are connected to ports OUT0 an OUT1 of the output port 67, an a direct current is supplied to each of the motors M1 an M2 when the logical levels at the ports OUT0 a OUT1 are "L". For instance, by successively changing the excitation phases of φ0, φ1, φ2 and φ3 when the logical level is "L", the stepping motor M1 for moving the lens 15 rotates.

Figure 5B:
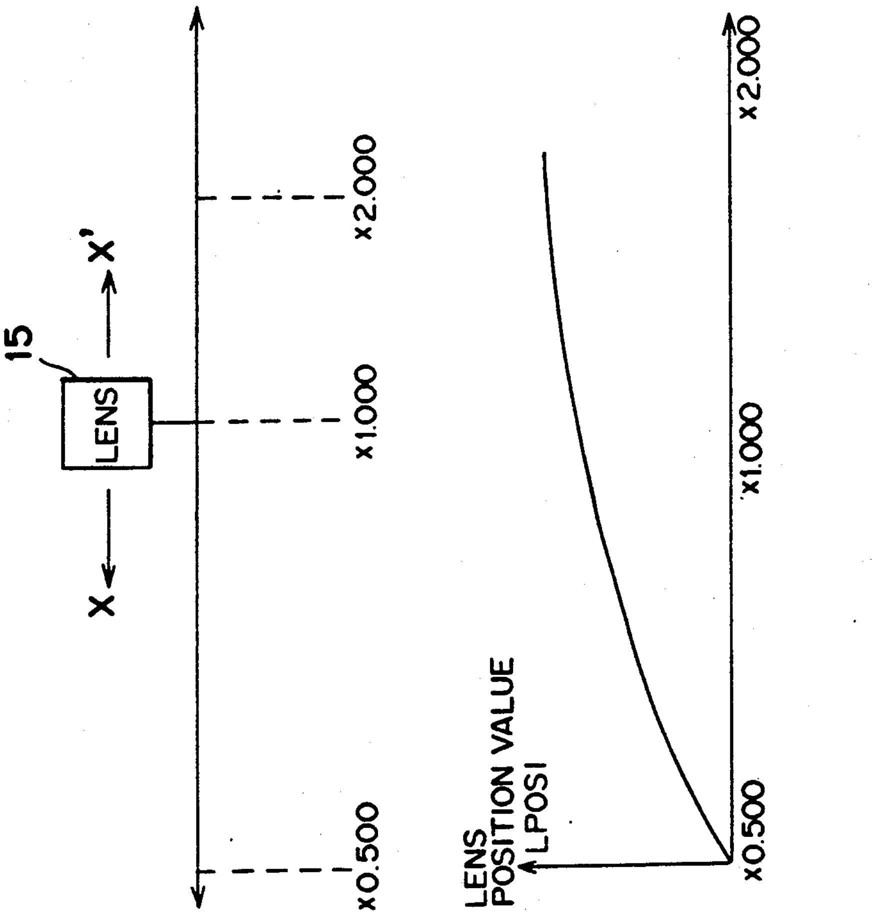
FIGS. 5*a* and 5*b* are views of the lens and the mirrors showing the movements.
Figure 5A:
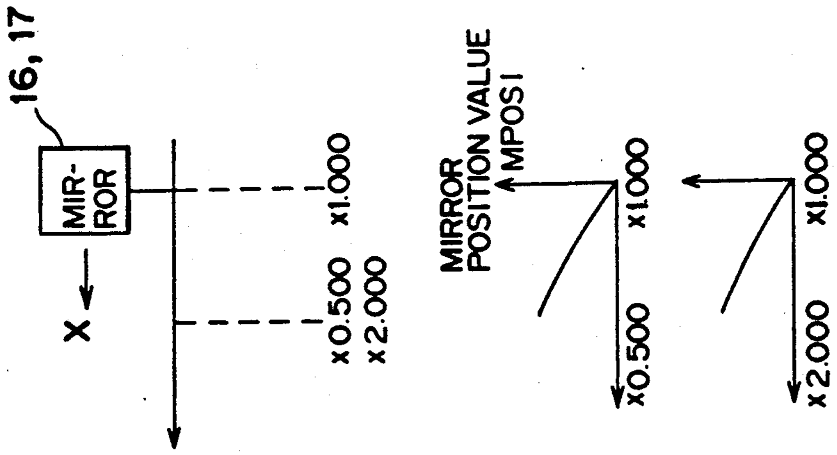

The following describes a method of figuring out positions here the lens 15 an the mirrors 16 an 17 are to be set at a magnification ratio, referring to FIGS. 5*a* an 5*b*.

Suppose that the magnification ratio is "m" (m>0), the focal length is "f" (f>0), an a defocusing amount (lens aerration) is "D" (D>0), the lens position "x" can be expressed b the following equation (3), where the lens position "x" is represented by "0" when the magnification ratio "m" is "1".

$$x = fx\frac{m-1}{m} - \frac{m-1}{m+1} \times \frac{D}{2} \tag{3}$$

In order to express the lens position in a positive number at any magnification ratio raging from 0.500 to 2.000, the lens position at the minimum magnification ratio of 0.500 should be represented by "0", an a value "MG×0.001" (MAG is a value set by an operator as a magnification ratio, an the data is transmitted from the master microcomputer) should substituted for the magnification ratio "m". Also, in order to express the lens position in an integer at any magnification ratio, the lens position should be represented by a number of steps by which the stepping motor M1 is rotate in order to move the lens 15 to the position. Supposing that the travel of the lens 15 per pulse of the stepping motor M1 is "a", a lens position value LPOS1 can e expressed by the following equation (4).

$$LPOS1 = \frac{f}{a}\left(10^3 - \frac{10^6}{MAG}\right) \times 10^{-3} + \left(\frac{10^3 - MAG}{MAG + 10^3}\right) \times \frac{D}{2a} - \frac{f}{a}\left(10^3 - \frac{10^6}{500}\right) \times 10^{-3} - \left(\frac{10^3 - 500}{500 + 10^3}\right) \times \frac{D}{2a} \tag{4}$$

The position "x" of the mirrors 16 and 17 can be expressed the following equation (5), where the mirror position is represented "0" when the magnification ratio is "1".

$$x = \left(m - 2 + \frac{1}{m}\right) \times \frac{f}{2} \tag{5}$$

When a value "MG×0.001" (MG is a value set an operator as a magnification ratio, and the data is transmitted from the master microcomputer) substitutes for the magnification ratio "m", a mirror position value MPOS1 at a set magnification ratio MG can be expressed by the following equation (6).

$$MPOS1 = \left(MAG \times 10^{-3} - 2 + \frac{10^3}{MAG}\right) \times \frac{f}{2a} \tag{6}$$

Figure 6:
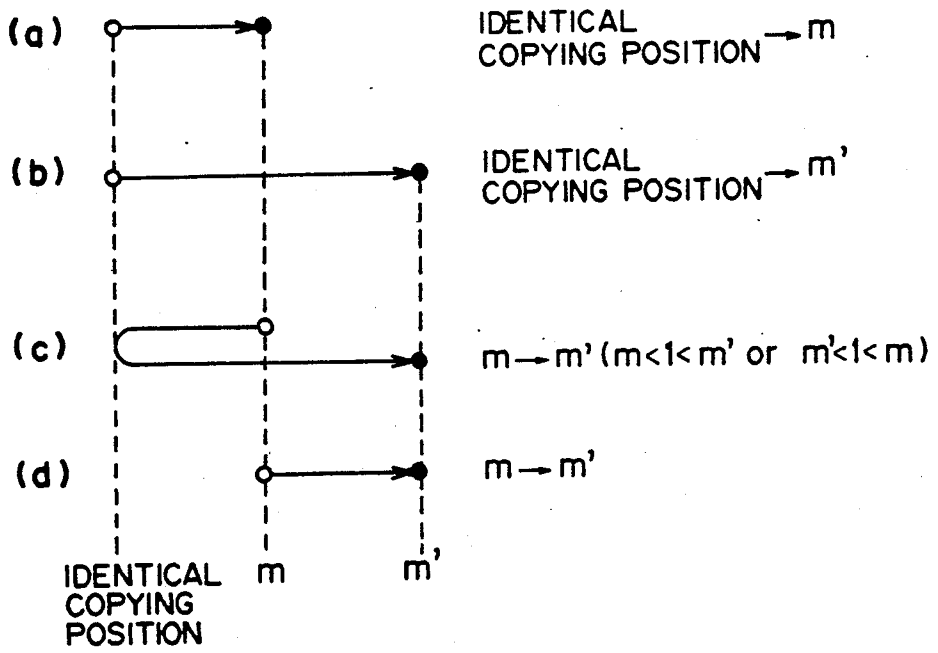

In this embodiment the lens position value LPOS1 an the mirror position value MPOS1 at a set magnification ratio MG in accordance with the focal length "f" are calculate referring to the equations (4) and (6). Then, the stepping motors M1 an4 M2 are independently driven according to the calculate values to move the lens 15 an the mirrors 16 an 17 to the respective determine positions. In positioning the lens 15 an the mirrors 16 an 17 to increase the magnification, the lens 15 is move before the mirrors 16 an 17. On the contrary, in positioning the lens 15 an the mirrors 16 an 17 to reduce the magnification, the mirrors 16 an 17 are move before the lens 15. This scheme is to avoid a collision between the lens unit an the mirror unit. Regarding a movement of the mirrors 16 an 17, a current mirror position value is store in the RAM 63, an the difference between the current mirror position value an a mirror position value at a newly set magnification ratio is figure out, an the mirrors 16 an 17 are move directly to the position corresponding with the new magnification ratio without returning to the home position. Referring to FIG. 6, the mirrors 16 an 17 move not in the move (c) but in the mode (d), which is the shortest way where the mirrors 16 an 17 are positioned in the shortest time.

Figure 13:
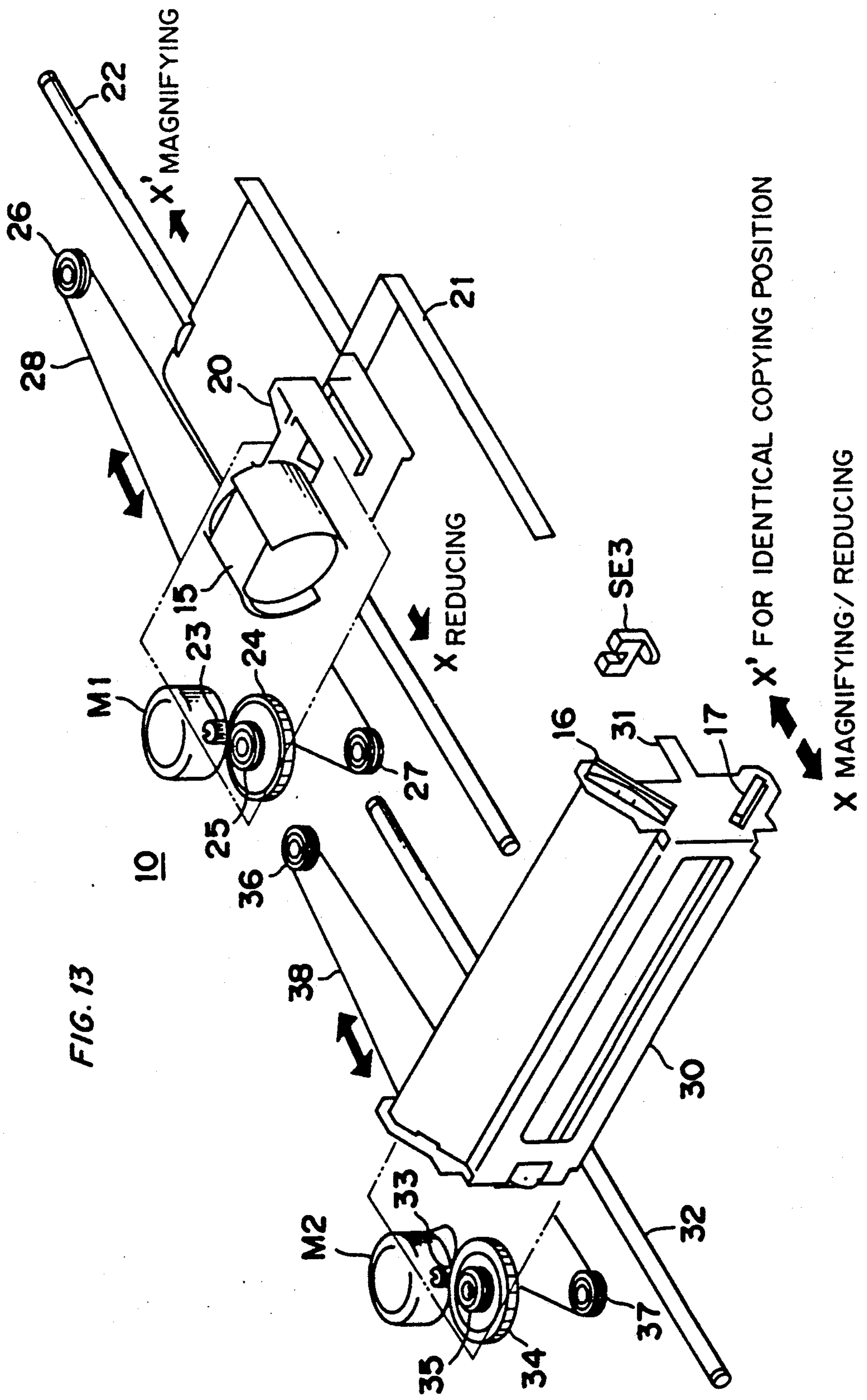

FIG. 13 shows a modification of the drive mechanism for the lens an the mirror units, in which a sensor SE3 is commonly use for detecting whether the lens 15 is at the home position an detecting whether the mirrors 16 an 17 are at the home position. Both the protrusion 21 of the lens unit an the protrusion 31 of the mirror unit can advance to an retreat from the optical axis of the sensor SE3.

The control of the operation is hereinafter described with reference to the flowcharts in FIGS. 7 through 12.

Figure 7:
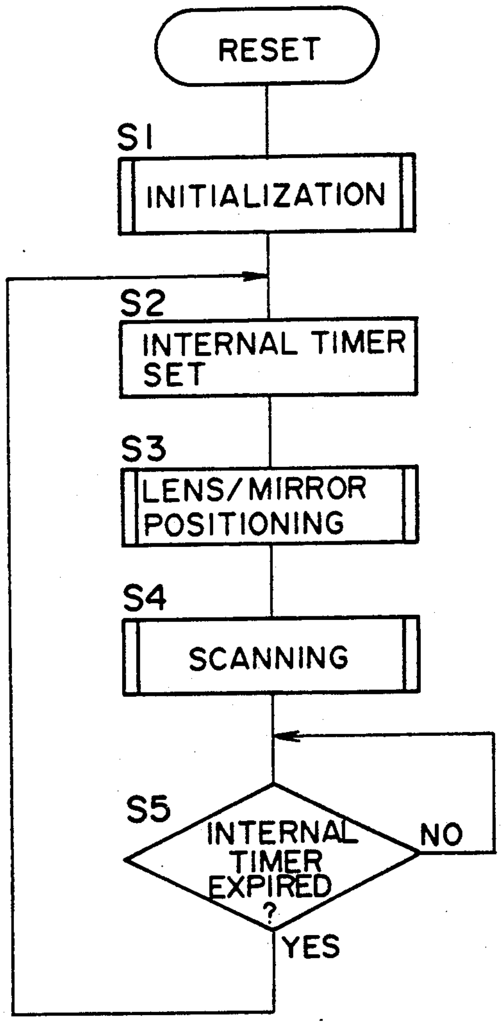
Figure 8A:
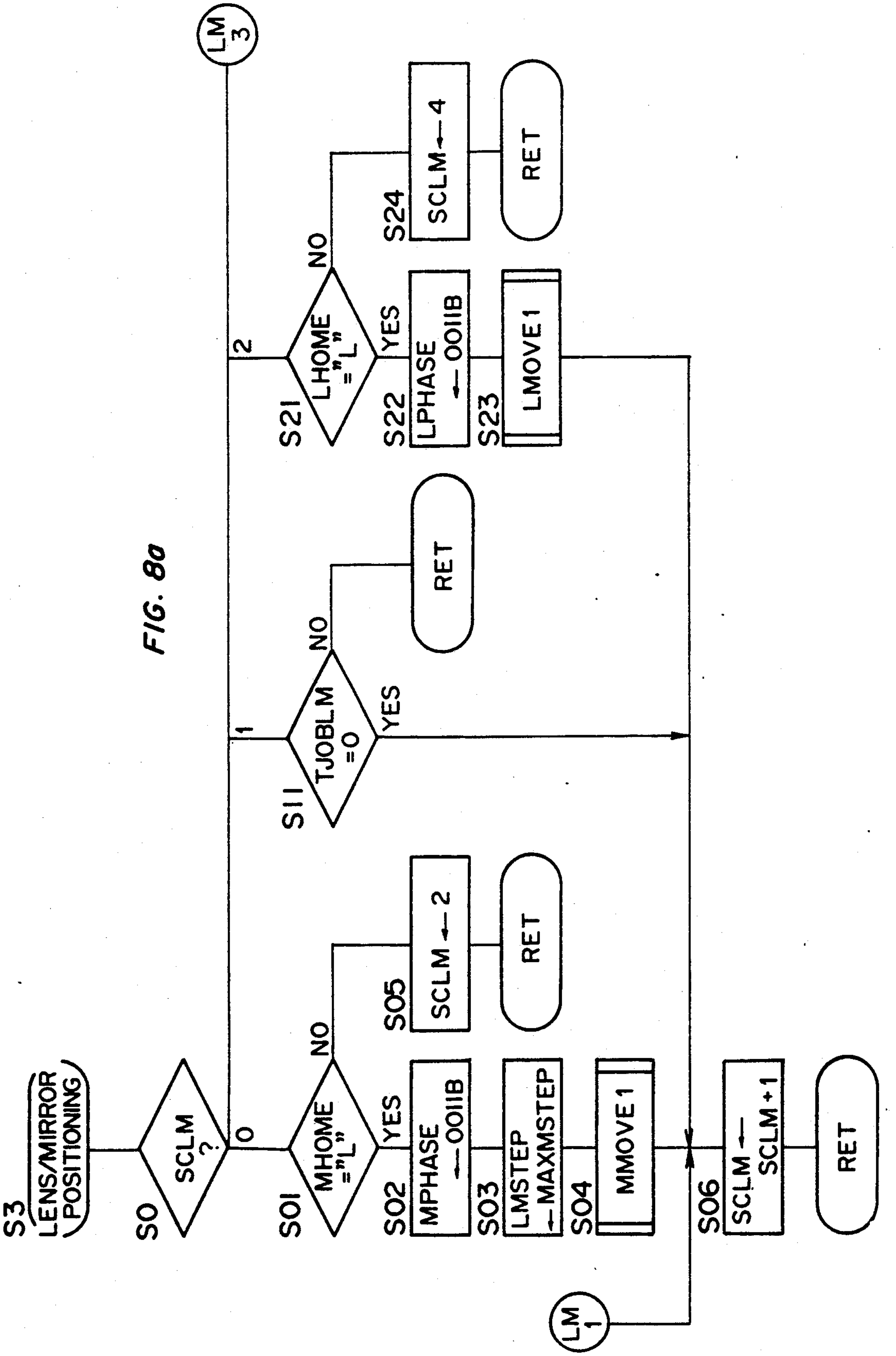
FIGS. 8*a* through 8*e* are flowcharts of a subroutine for positioning the lens an the mirrors performed in the main routine shown in FIG. 7.
Figure 8B:
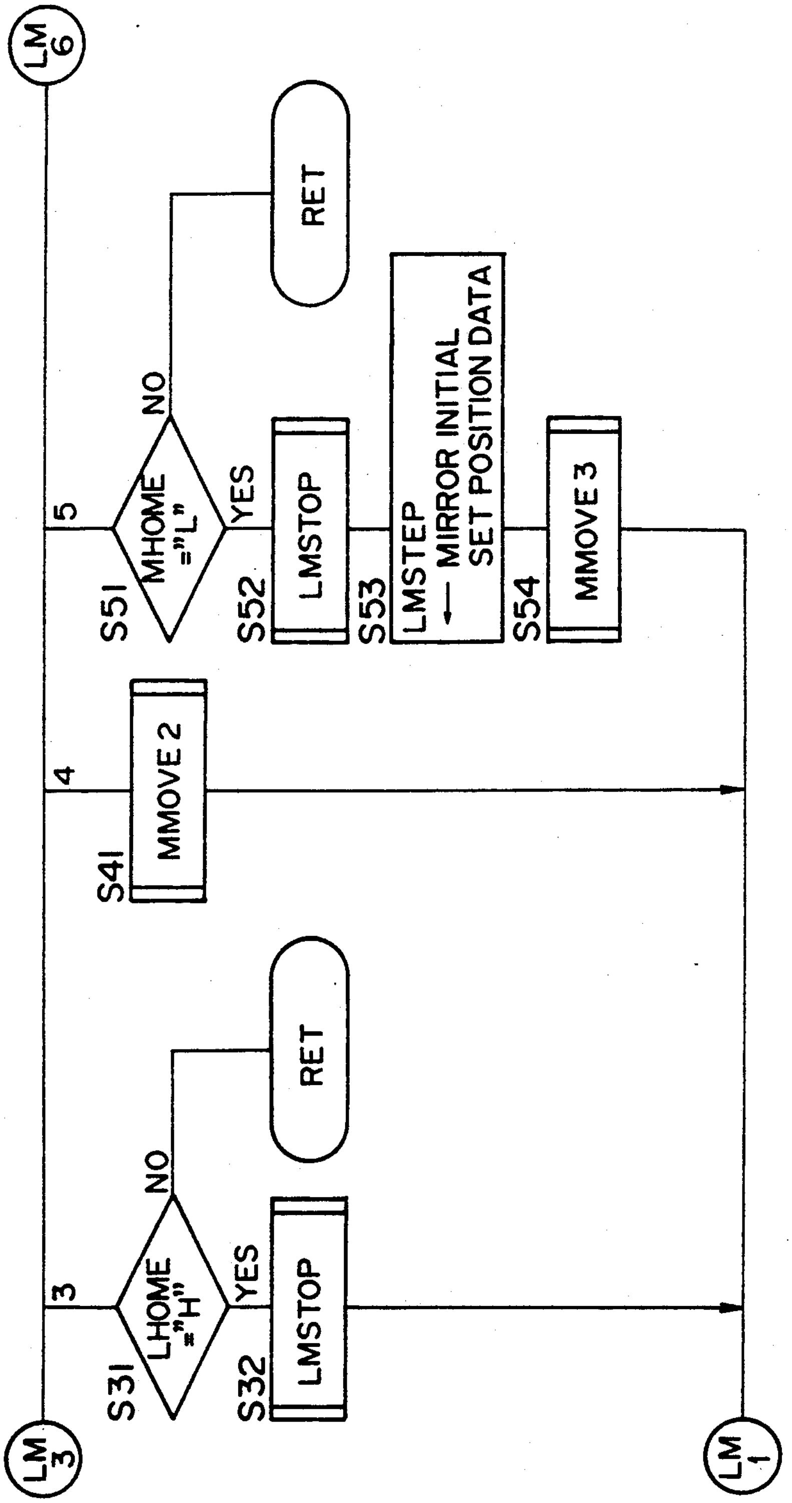
Figure 8C:
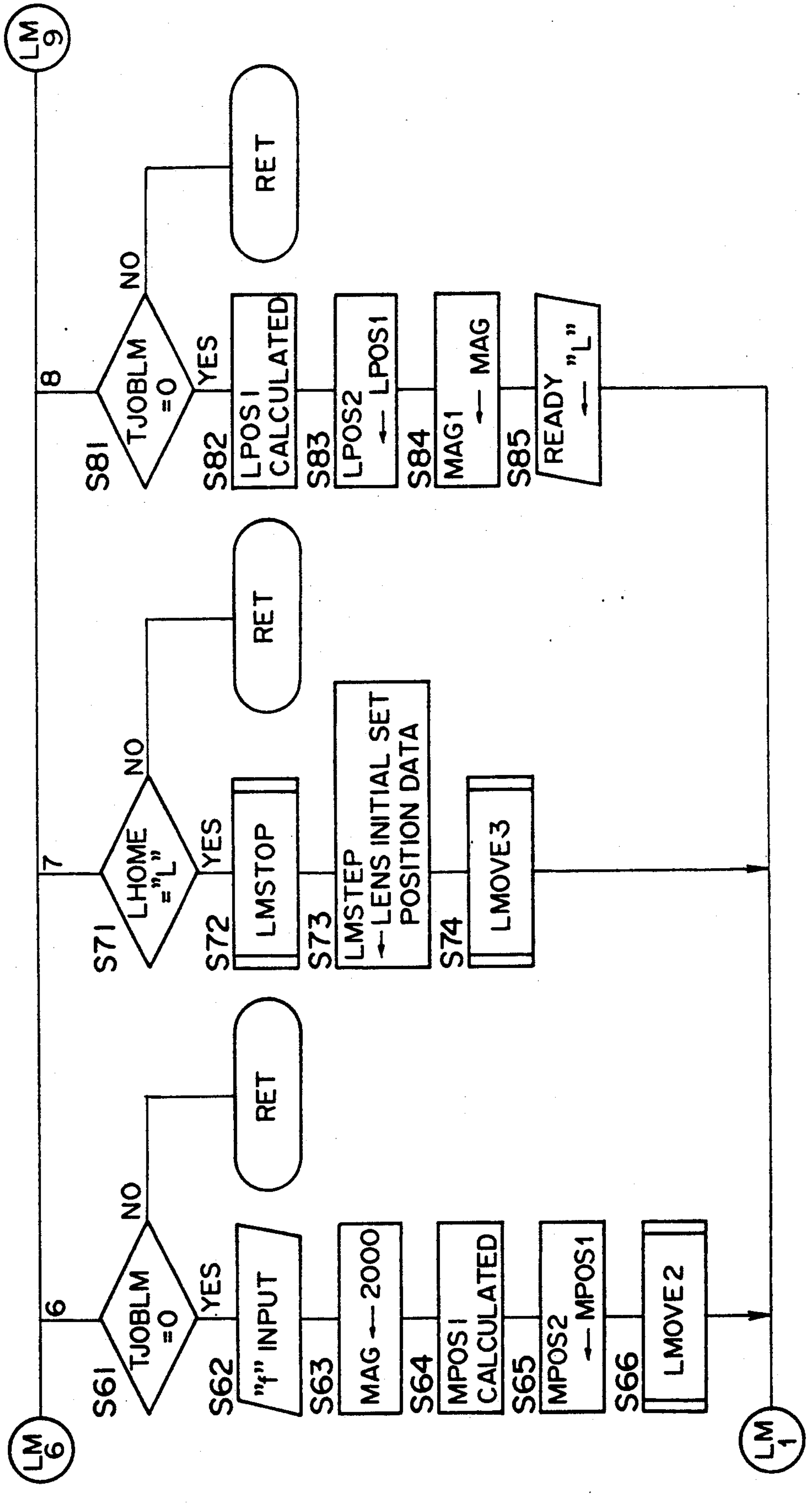
Figure 8D:
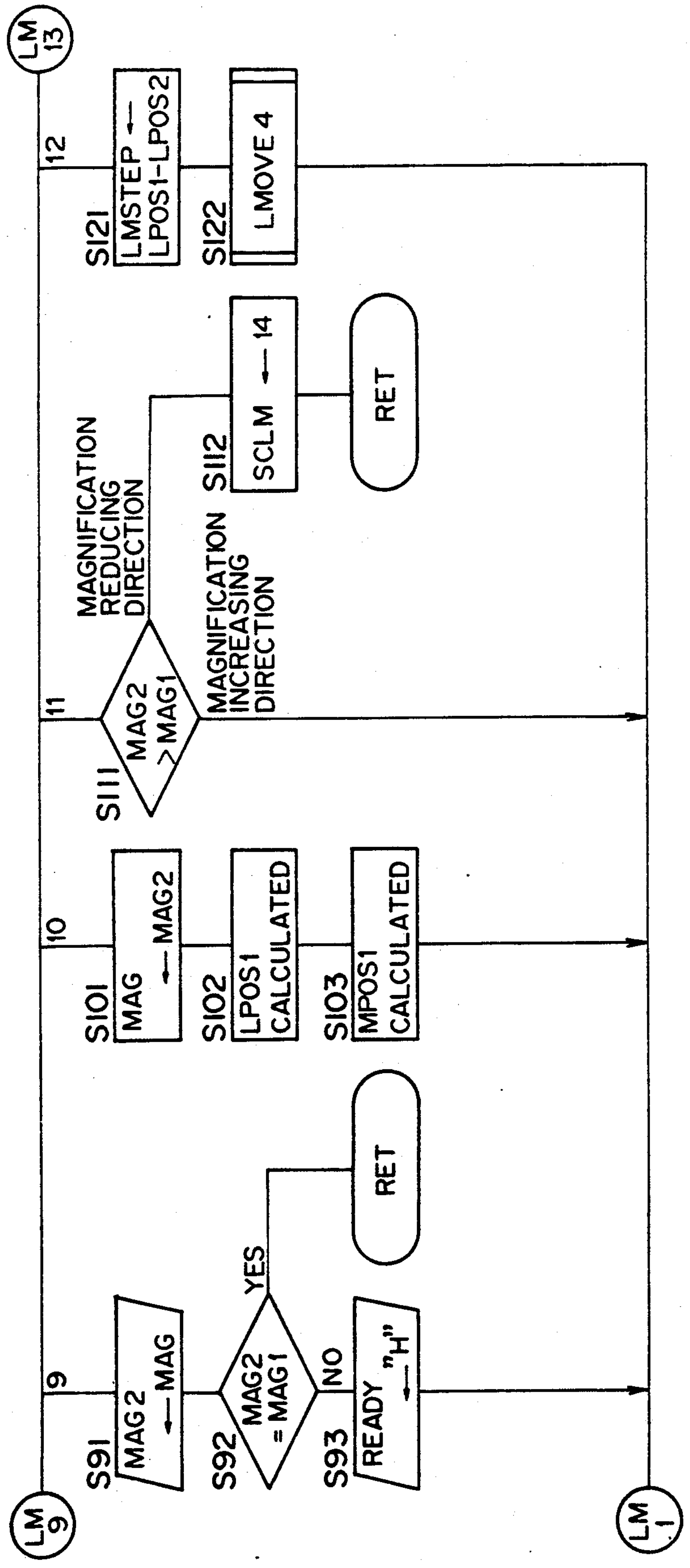
Figure 8E:
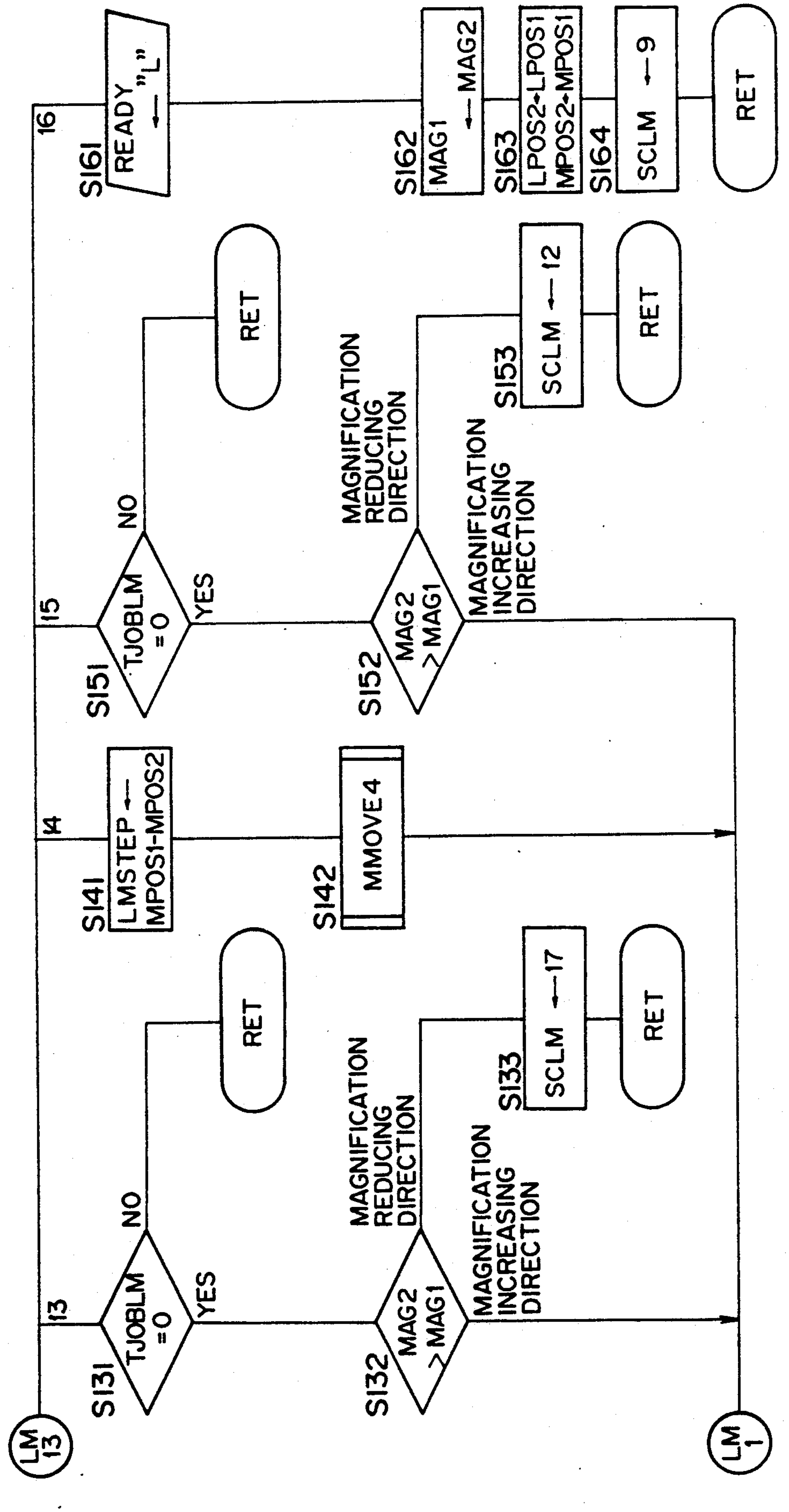

FIG. 7 shows a main routine of the microcomputer 60.

When the machine is supplied with power to start a program, the output port 67 an4 the RM 63 are initialize at step S1, an an internal timer is set at step S2. The internal tier is for determining the processing time for one royole of the main routine. Clock signals f CL generate the generator 65 are counted by the timer unit 66. Then a subroutine for positioning the lens 15 an the mirrors 16 an 17 is called at step S3, an a subroutine for scanning an original with the optical system 10 is called at step S4. When it is confirmed at step S5 that the internal timer has expired, the processing returns to step S2 to repeat the processes at steps S3 an S4.

Referring to FIGS. 8*a* through 8*e*, the lens/mirror positioning subroutine to be performed at step S3 of the main routine is hereinafter described in detail. In this subroutine, a state counter SCLM is checked at step S0, an the processing process in accordance with the count value.

When the count value of the state counter SCLM is "0" (initial state), it is judge at step S01 whether the logical level of a signal MHOME sent from the mirror home position sensor SE2 is "L". The sensor SE2 generates an "L" signal when the protrusion 31 is advancing into the optical axis, and generates an "H" signal when the protrusion 31 retreats from the optical axis. When the logical level of the signal MHOME is "L", which means the protrusion 31 of the mirror unit is advancing into the optical axis of the sensor SE2, at step S02 a value 0011(B represents a binary number) is stored as an initial value in a memory MPHASE for determining the excitation phase of the stepping motor M2. At step S3, a value MXMSTEP representing a maximum travel of the mirrors 16 an 17 is store in a memory LMSTEP for determining the number of steps which the stepping motors M1 an M2 rotate. Subsequently a subroutine MMOVE1 for moving the mirrors 16 an4 17 in the direction indicate by the arrow X an amount corresponding to a value store in the memory LMSTEP is called at step S04, an the state counter SCLM gains an increment at step S06, that is, the state counter SCLM is set to "1". Then, the processing returns to the main routine.

When the logical level of the signal MHOME sent from the sensor SE2 is "H" ("0" at step S01), that is, hen the protrusion 31 of the mirrors unit retreats from the optical axis of the sensor SE2, the state counter SCLM is set to "2" at step S05. Then, the processing returns to the main routine.

When the count value of the state counter SCLM is "1", it is judge at step S11 whether a register TJOBLM is "0", that is, whether the movement of the mirrors 16 an 17 in accordance with the maximum value has been complete. The processing repeats the main routine until the value TJOBLM becomes "0". Then, the state counter SCLM gains an increment (is set to "2") at step S06.

When the count value of the state counter SCLM is "2", it is at step S21 whether the logical level of a signal LHOME sent from the sensor SEl is "L" or "H". When the logical level of the signal LHOME is "L", which means that the protrusion 21 of the lens unit is advancing into the optical axis of the sensor SE1, at step S22 a binary number 0011B is store as an initial value in a memory LPHASE for determining the excitation phase of the stepping motor M1. Then, a subroutine LMOVE1 for moving the lens 15 in the direction indicated by the arrow X′ to separate the protrusion 21 from the sensor SE1 is called at step S23, an the state counter SCLM gains an increment (is set to "3") at step S06. On the other hand, when the logical level of the signal LHOME is "H" ("0" at step S21), which means that the protrusion 21 of the lens unit retreats from the optical axis of the sensor SE1, the state counter is set to "4" at step S24, an the processing returns to the main routine.

When the count value of the state counter SCLM is "3", it is judged at step S31 whether the logical level of the signal LHOME sent from the sensor SE1 is "H" that is, whether the protrusion 21 has retreated from the sensor SE1. The processing repeats the main routine until the logical level of the signal LHOME becomes "H". When the logical level of the signal LHOME is judge to be "H", a subroutine LMSTOP for stopping movements of the lens 15 an the mirrors 16 and 17 is called at step S32. Then, the state counter SCLM gains an increment (is set to "4") at step S06, an the processing returns to the main routine.

Regarding the copying machine having only one sensor SE3 for detecting whether the lens 15 is at the home position and for detecting whether the mirrors 16 an 17 are at the home position, positioning of the lens 15 must be performed in a state that the protrusion 31 of the mirror unit retreats from the optical axis of the sensor SE3, an positioning of the mirrors 16 an 17 must be performed in a state that the protrusion 21 of the lens unit retreats from the optical axis of the sensor SE3. For this reason, the above-described processes are performed. However, in the machine having separate sensors SE1 an SE2 for detecting whether the lens 15 is at the home position and for detecting whether the mirrors 16 and 17 is at the home position, these processes can be eliminate.

When the count value of the state counter SCLM is "4", a subroutine MMOVE2 for moving the mirrors 16 an 17 in the direction indicated by the arrow X′ to the home position is called at step S41, an the state counter SCLM gains an increment (is set to "5") at step S06.

When the count value of the state counter SCLM is "5", upon the confirmation at step S51 of the logical level of the signal MHOME sent from the sensor SE2 to be "L", which means the arrival of the mirrors 16 an 17 at the home position, the subroutine LMSTOP performed at step S32 is called at step S52 to stop the movement of the mirrors 16 an 17.

In this embodiment, when the machine starts to e supplied with power, the lens 15 an the mirrors 16 an 17 are set to the respective positions to obtain a magnification ratio of 2.000 (the maximum magnification ratio). Therefore at step S52 the number of steps which the stepping motor M2 is to rotate to move the mirrors 16 an 17 to a position to obtain a magnification ratio of 2.000 is store in the memory LMSTEP. It is note that the lens 15 and the mirrors 16 and 17 may be set to the respective positions to obtain any magnification ratio as well as a magnification ratio of 2.000 as an initial set position. In the machine having only one home position sensor SE3, however, initial set positions of the lens 15 and mirrors 16 and 17 must be positions to obtain a magnification ratio larger than 1.000.

Next, a subroutine MMOVE3 for moving the mirrors 16 an 17 in the direction of X in accordance with a value in the memory LMSTEP is called at step S54, an the state counter SCLM gains an increment (is set to "6") at step S06.

When the count value of the state counter SCLM is "6", it is judge at step S61 whether the register TJOBLM is "0", that is, whether the movement of the mirrors 16 an 17 is complete. The processing repeats the main routine until the register TJOBLM becomes "0". hen the register TJOBLM is judge to be "0", the focal length "f" is entered at step S62. The focal length "f" is used for calculating position values of the lens 15 an the mirrors 16 an 17. The value 2.000 is entered at step S63, an substitutes for MG in the equation (6) to calculate a mirror position value MPOS1 at a magnification ratio of 2.000. Further, the calculate value MPOS1 is store in a memory MPOS2 at step S65 so that the vale MPOS1 can be compare with a mirror position value at a next set magnification ratio. Thus, initial setting of the mirrors 16 an 17 is complete, and the mirror position value at an initial magnification ratio is obtained. Subsequently, a subroutine LMOVE2 for moving the lens 15 in the direction of X to the home position is called at step S15, an the state counter SCLM gains an increment (set to "7) at step S06.

When the count value of the state counter is "7", upon the confirmation at step S71 of the logical level of the signal LHOME sent from the sensor SE1 being "L", which means the arrival of the lens 15 at the home position, the subroutine LMSTOP performed at steps S32 an S52 is called at step S72. At step S73, a value representing the number of steps by which the stepping motor M1 is to rotate to move the lens 15 to a position to obtain a magnification ratio of 2.000 is store in the memory LMSTEP. Subsequently, a subroutine LMOVE3 for moving the lens 15 in the direction of X' in accordance with a value in the memory LMSTEP is called at step S74, an the state counter SCLM gains an increment (is set to "8") at step S06.

When the count value of the state counter SCLM is "8", it is judged at step S81 whether the register TJOBLM is "0", that is, whether the lens 15 has move by the number of steps set at step S73. The processing repeats the main routine until the register TJOBLM becomes "0". When the register TJOBLM is judge to be "0", at step S82 a lens position value LPOS1 at a magnification ratio of 2.000 is calculate referring to the equation (4). The calculated value LPOS1 is store in a memory LPOS2 at step S83 so that the value can be compare with a lens position value at a next set magnification ratio. The current magnification ratio (2.000) is store in a memory MAG1 at step S84, an the logical level of the signal READY is set to "L" at step S85. Then, the state counter SCLM gains an increment (is set to "9"), at step S06. The logical level of the signal READY is "H" during positioning of the lens 15 an the mirrors 16 an 17, an it is "L" in other conditions. Since the logical level of the signal READY is set to "L" at step S85, the lens 15 an the mirrors 16 an 17 have been set to positions to obtain a magnification ratio of 2.000, an in this state, a copying operation for making a magnified copy of an original in a rate of 2 to 1 is available. In a state that the logical level of the signal READY is "L", when the logical level of the scan demanding signal SC sent from the master microcomputer becomes "L", the optical system 10 starts scanning an original at step S4 shown in FIG. 7.

When the count value of the state counter SCLM is "9", a magnification ratio MG set by an operator an transmitted from the master microcomputer is store in a memory MG2. The value of MG2 is compare with the value of MG1 (the magnification ratio according to which the lens 15 an the mirrors 16 and 17 are currently positioned). When the values are equal, the processing returns to the main routine. When the vales are different, which means that the lens 15 and the mirrors 16 an 17 are require to move, the logical level of the signal READY is set to "H" at step S93. Then, the state counter SCLM gains an increment (is set to "10") at step S06.

When the count value of the state counter SCLM is "10", the magnification ratio MG2 is store in the memory MG at step S101. At step S102 a lens position value LPOS1 at the magnification ratio MG2 is calculate referring to the equation (4), an at step S103 a mirror position value MPOS1. is calculated referring to the equation (6). Then, the state counter SCLM gains an increment (is set to "11") at step S06, and the processing returns to the main routine.

The values calculate referring to the equations (4) and (6) at steps S102 an S103 represent the numbers of steps of the respective stepping motors M1 an M2, an the smallest unit of the movements of the lens 15 an the mirrors 16 an 17 is corresponding to one step of the respective stepping motors M1 an M2. Therefore a lens forward length L1 an a conjugate length L2 obtained by movements of the lens 15 an the mirrors 16 an4 17 in accordance with values calculated from the equations (4) and (6) are different from theoretical valves calculated the equations (1) and (2). In this embodiment, focus an magnification are regulate minute by calculating lens an mirror positions from the values LPOS1 an MPOS1. The processes will be described in detail later.

When the count value of the state counter SCLM is "11", the new magnification ratio MAG2 is compare with the former magnification ratio MAG1 at step S11. When the value MAG2 is larger than the value MAG1, the state counter SCLM gains an increment at step S06 to move the lens 15 before the mirrors 16 an4 17, an when the value MG2 is smaller than the value MAG1, the state counter is set to "14" at step S112 to move the mirrors 16 an 17 before the lens 15. When the value MG2 is larger than the value MG1, the lens 15 should be move in the direction of X', and in this case, the lens 15 is move before the mirrors 16 and 17. On the contrary, when the value MG2 is smaller than the value MG1, the lens 15 should e moved in the direction X, and in this case, the mirror 16 an 17 are over before the lens 15. This is to avoid a collision between the lens 15, an4 the mirrors 16 an 17.

When the count value of the state counter SCLM is "12", a saturation "LPOS1−LPOS2" (LPOS1 is a newly calculated lens position value, and LPOS2 is a former lens position value) is one, an the result is stored in the memory LMSTEP at step S121. Subsequently, a subroutine LMOVE4 for moving the lens 15 according to the value store in LMSTEP is called at step S122, an the state counter gains an increment (is set to "13") at step S06.

When the count value of the state counter SCLM is "13", it is judged at step S131 whether the register TJOBLM is "0", that is, whether the movement of the lens 15 has been complete. When the result at step S131 is "YES", the magnification ratios MAG2 an MAG1 are compare with each other at step S132. When the value MAG2 is larger than the value MAG1, the state counter gains an increment (is set to "14") at step S06 to process to a process of moving the mirrors 16 an 17. When the value MG2 is smaller than the value MAG1, the state counter is set to "16" at step S133 because the movement of the mirrors 16 an 17 was complete before the movement of the lens 15. Then, the processing returns to the main routine.

When the state counter is "14", a subtraction "MPOS1−MPOS2" (MPOS1 is a newly calculate mirror position value, an MPOS2 is a former mirror position value), an the result is store in the memory LMSTEP. Subsequently, a subroutine MMOVE4 for moving the mirrors 16 an 17 according to the value store in the memory LMSTEP is called at step S142, and the state counter gains an increment (is set to "15") at step S06. Referring to the equation (5), the mirror position "x" at a magnification ratio "m" is the same as the mirror position "x" at a magnification ratio "1/m". That is, the mirrors 16 an 17 are not required to move in order to change the magnification from "m" to "1/m". hen the magnification is change from "m" ($m>1$) to "m'" ($m'<1$), the mirrors 16 an 17 should be move by only a travel corresponding with the difference between the conjugate lengths at the magnification ratio "m" an at the magnification ratio "m'" (refer to the mode (d) in FIG. 6). The memory of a former mirror position value enables the mirrors 16 an 17 to move in the shortest way.

When the count value of the state counter SCLM is "15", it is judged at step S151 whether the register TJOBLM is "0", that is, whether the movement of the mirrors 16 an 17 has been complete. When the result at step S151 is "YES", the values MAG2 an MAG1 are compare at step S152. Then the value MAG2 is smaller than the value MAG1, the state counter SCLM is set to "12" at step S153 to process to a process of moving the lens 15. When the value MAG2 is larger than the vale MAG1, in which case the movement of the lens 15 was completed previously, the state counter SCLM gains an increment (is set to "16") at step S06.

When the count value of the state counter SCLM is "16", the logical level of the signal READY is set to "L" at step S161 to indicate the completion of positioning of the lens 15 and the mirrors 16 an 17. The memory MAG1 is renewed with the value MAG2 at step S162, an the memories LPOS2 an4 MPOS2 are renewed with the values LPOS1 an LPOS1 respectively at step S163 so that these values will be used for a next magnification change. Then, the state counter SCLM is set to "9" at step S164, in which state another magnification ratio is accepted.

The following describes a method for correcting the lens position value LPOS1 an the mirror position value MPOS1 calculated at steps S102 an S103 respectively to achieve focus and a more accurate magnification.

(1) Achieving Focus prior to Magnification

When an operator sets the magnification of a copying machine varying within a range of 50% to 200% by 1% to a value "1", a travel of the lens 15 is calculate referring to the equation (3), an the number of steps LPOS1 by which the stepping motor M1 rotates to move the lens 15 is calculated referring to the equation (4). The calculate value LPOS1 is an integer, an the actual travel of the lens 15 (LPOS1 multiplied by travel "a" of the lens 15 per step of the stepping motor M1) is different from a theoretical travel to obtain the magnification ratio "m1". When the set magnification ratio "m1" is 100, a travel of the lens 15 calculated referring to the equation (4) will be corresponding with not 100% but another magnification ratio "m2" near 100%. The larger the travel "a" of the lens 15 per step of the stepping motor M1 is, the larger the difference between the values "m1" an "m2" becomes. The magnification ratio "m2" may be almost 99.9% or 100.1%.

Therefore after calculating a travel of the lens 15 at a set magnification ratio "m1" referring to the equation (4), a magnification ratio "m2" which is theocratically corresponding with the travel of the lens 15 is figure out. The magnification ratio "m2" must be calculated at least with a digit of 0.1%.

When the calculation of a travel of the lens 15 is prior to the calculation of a travel of the mirrors 16 an 17, a aggregation ratio "m2" is calculated from the calculated travel of the lens 15, an the value "m2" is used for calculating a travel of the mirrors 16 an 17 to achieve focus. On the contrary, when the calculation of a travel of the mirrors 16 an 17 is prior to the calculation of a travel of the lens 15, a magnification ratio "m2" is calculated from the calculate travel of the mirrors 16 an 17 (MPOS1 calculate referring to the equation (6) multiplied travel "a" of the mirrors 16 an4 17 per step of the stepping motor M2), an the value "m2" is use for calculating a travel of the lens 15.

The following is a detailed description of the calculations.

(1-a) In a case of moving the mirrors 16 an 17 before the lens 15

At step S102, a value "m1" (0.50. 0.51–1.99, 2.00) transmitted from the master microcomputer as a magnification ratio substitutes for MAG in the equation (4) to calculate a lens position value LPOS1 (an integer). Then, the value LPOS1 is use for calculating a magnification ratio "m2" referring to the following equations (7) through (10):

$$A=12f-3D-a.D-6a.LPOS1 \tag{7}$$

$$B=500(3D-6f-a.D-a.LPOS1) \tag{8}$$

$$C=6\times 10^6 f \tag{9}$$

$$m2=\frac{-B\pm\sqrt{B^2-A\cdot C}}{A}\times 0.001 \tag{10}$$

$(0.490 \leqq m2 \leqq 2.010)$

Then, in calculating a mirror position value MPOS1 at step S103, the value "m2" substitutes for MAG in the equation (6) so that the mirrors 16 and 17 are move to a position to achieve focus.

(1-b) In a case of moving the lens 15 before the mirrors 16 an d17

This is a case that the process at step S103 is performed before the process at step S102. A set magnification ratio "m1" substitutes for MG in the equation (6) to calculate a mirror position value MPOS1 (an integer). Then, the value MPOS1 is use for calculating a magnification ratio "m2" referring to the following equation (11):

$$m2 = \frac{f + a \cdot MPOS1 \pm \sqrt{(f + a \cdot MPOS1) \times 10^6 - 10^6 \cdot f^2}}{f} \times 0.001 \quad (11)$$

$$(0.490 \leqq m2 \leqq 2.010)$$

Next, in calculating a lens position value LPOS1 at step S102, the value "m2" substitutes for MAG in the equation (4) so that the lens 15 is move to a position to achieve focus.

(2) Achieving Magnification prior to Focus

First, a set magnification ratio "m1" is used for calculating a lens position value LPOS1 referring to the equation (4). In this embodiment, a lens position value is a relative value on the assumption that the value at a magnification ratio of 50 is "0". The calculate lens position value LPOS1 is converted into a lens forward length, an a theoretical conjugated length at the magnification ratio "m1" is further calculate. Since a mirror position value MPOS1 calculate from the equation of (6) is a relative value on the assumption that the value at a magnification ratio of 100% is "0", a correct position of the mirrors 16 an 17 at a magnification ratio cannot be figure out from the calculation referring to the equation (6). Therefore the theoretical conjugate length is use for calculating a mirror position value. In this method, the ratio of the lens forward length and the conjugate length is "1" to "1+m1", an the accurate magnification will be achieve.

When calculating a mirror position value first, the processes should be performed in reverse. Specifically, a conjugate length is calculate, an a theoretical lens forward length is calculated. Then, the theoretical lens forward length is use for calculating a lens position value.

The following is a detailed description of the calculations.

(2-a) In a case of moving the mirrors 16 an 17 before the lens 15

At step S102, a lens position value LPOS1 (an integer) is calculated by substituting a set magnification ratio "m1" for MAG in the equation (4). The lens forward length at a magnification ratio of 50% is calculate to be 3f referring to the equation (1), an a lens forward length "Lm1" at the magnification ratio "m1" can be calculated as follows:

$$Lm1 = 3f - a.LPOS1 \quad (12)$$

Also, a conjugate length Mm1 can e calculate as follows:

$$Mm1 = Lm1 \times (1 + m1) \quad (13)$$

The conjugate length at a magnification ratio of 100% is calculated to be 4f referring to the equation (2), an a travel "m1" of the mirrors 16 an 17 can e calculate as follows:

$$Nm1 = (Mm1 - 4f) \times \tfrac{1}{2} \quad (14)$$

At step S103, the calculated value "m1" is use for calculating a mirror position value MPOS1 referring to the following equation (15):

$$MPOS1 = m1/a \quad (15)$$

Thus, the mirrors 16 an 17 are move to a position to achieve accurate magnification.

(2-b) In a case of moving the lens 15 before the mirrors 16 and 17

This is a case that the process at step S103 is performed before the process at step S102. First, a mirror position value MPOS1 (an integer) is calculate by substituting a set magnification ratio "m1" for MAG in the equation (6). A conjugate length "M'm1" at the magnification ratio "m1" can e calculate as follows:

$$M'm1 = 4f + a.MPOS1 \quad (16)$$

Then, a theoretical conjugate length "L'm1" at the magnification ratio "m1" is calculate as follows:

$$L'm1 = M'm1/(1 + m1) \quad (17)$$

Further, a travel "N'm1" of the lens 15 can be calculate as follows:

$$N'm1 = 3f - L'm1 \quad (18)$$

Next, at step S102, the calculate value "N'm1" is used for calculating a lens position value LPOS1 referring to the following equation (19):

$$LPOS1 = N'm1/a \quad (19)$$

Thus, the lens 15 is move to a position to achieve accurate magnification.

Figure 9:
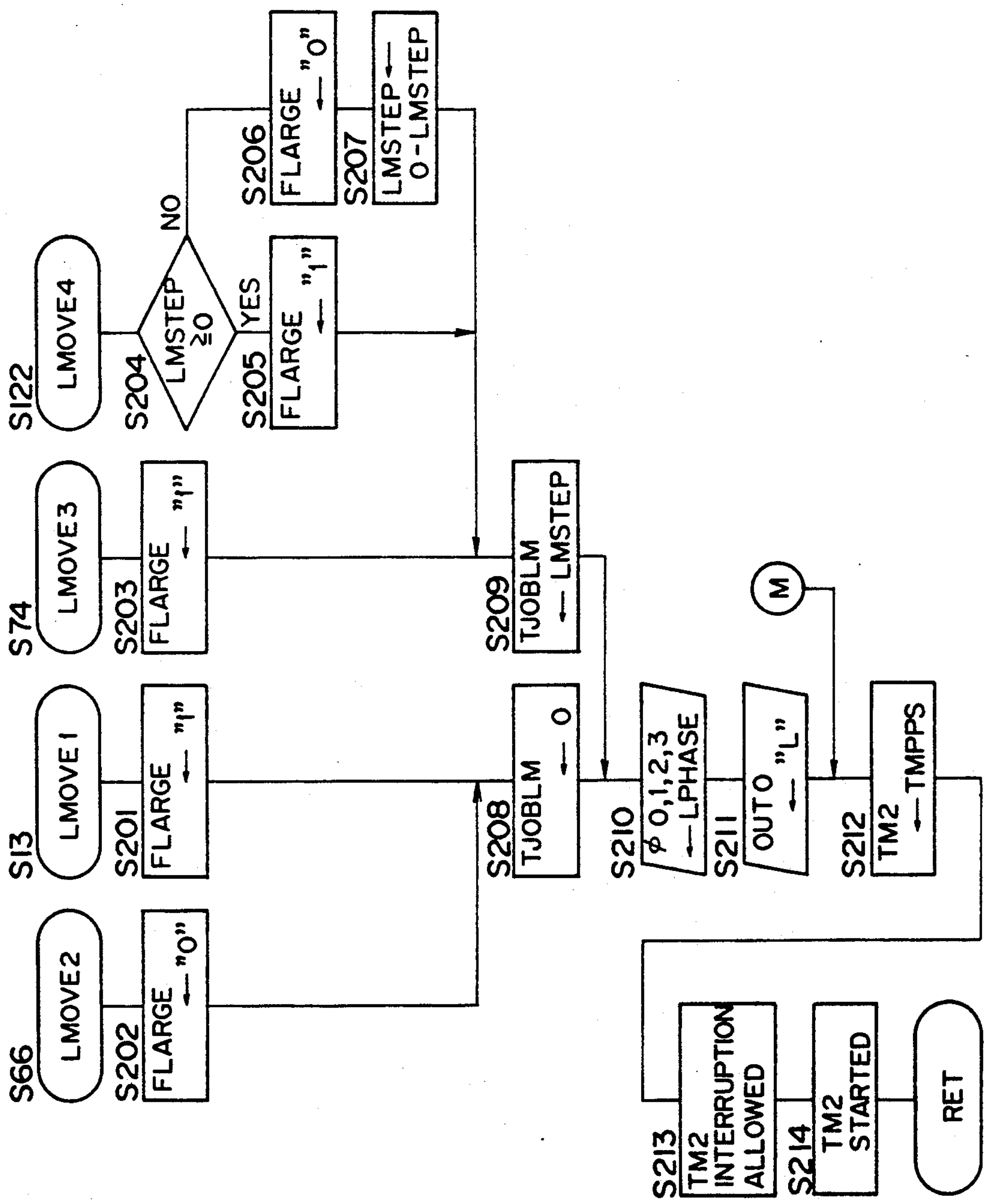

FIG. 9 shows the subroutines for starting to move the lens 15, which is performed at steps S13, S66, S74 an S122 of the lens/mirror positioning subroutine. The subroutine LMOVE1 is for moving the lens 15 in the direction of to separate the protrusion 21 from the sensor SE1. The subroutine LMOVE2 is for moving the lens 15 in the direction of to the home position. The subroutine LMOVE3 is for moving the lens 15 in the direction of X' to an initial set position. The surotine LMOVE4 is for moving the lens 15 in accordance with a value store in the memory LMSTEF.

At steps S201, S202, S203, S205 an S206, a flag FLARGE is set to "1" or reset to "0". The flag FLARGE is set to "1" when the lens 15 is driven to move to increase magnification, and is reset to "0" when the lens 15 is driven to move to reduced magnification. The flag FLARGE is use for determining a rotating direction of the stepping motor M1, that is, a change one of the magnetic excitation phase. At step S204 the moving direction is checked, and when the value LMSTEP is equal to or more than "0", the flag FLARGE is set to "1" at step S205 for a movement of the lens 15 in the direction of X' to increase magnification. When the value LMSTEP is smaller than "0", the flag FLARGE is reset to "0", and in order to express the number of steps by which the stepping motor M1 is to rotate to move the lens 15 in a positive number, the absolute vale of LMSTEP is store as a value LMSTEP.

At step S208, the register TJOBLM is reset to "0". This is to determine the completion of a movement of the lens 15 opening on the on/off state of the home position sensor SE1. At step S209, the vale LMSTEP is store in the register TJOBLM, an in this case a travel of the lens 15 depends on the value store in the register TJOBLM.

At step S210, data is sent from the memory LPHASE to the ports $\phi 0$, $\phi 1$, $\phi 2$, and $\phi 3$ to determine the initial lens excitation phase. At step S211, the logical level of the lens motor selection signal is set to "L" to supply an electric current to the stepping motor M1. Since a drive of the stepping motor M1 is realized by interruption of the internal timer of the timer unit 66 with a timer TM2, at step S212 a value TMPPS determining the driving frequencies of the lens 15 an the mirrors 16 an 17 is set in the timer TM2. In this embodiment, both the lens 15 an the mirrors 16 an 17 are driven at a constant speed at an identical frequency. For instance, when the frequency of the clock f CL is 5 MHz, in order to move the lens 15 an4 the mirrors 16 an 17 at a speed of 200 pps (200 pulses per second), the value TMPPS should be 25000. In this case, the internal timer is interrupted with pulses of the timer TM2 200 times per second, and the stepping motors M1 an M2 are driven at a frequency of 200 pps.

The interruption of the internal timer with the timer TM2 is allowed at step S213, an the timer TM2 starts counting at step S214. Then, the processing returns to the subroutine at step S3.

Figure 10:
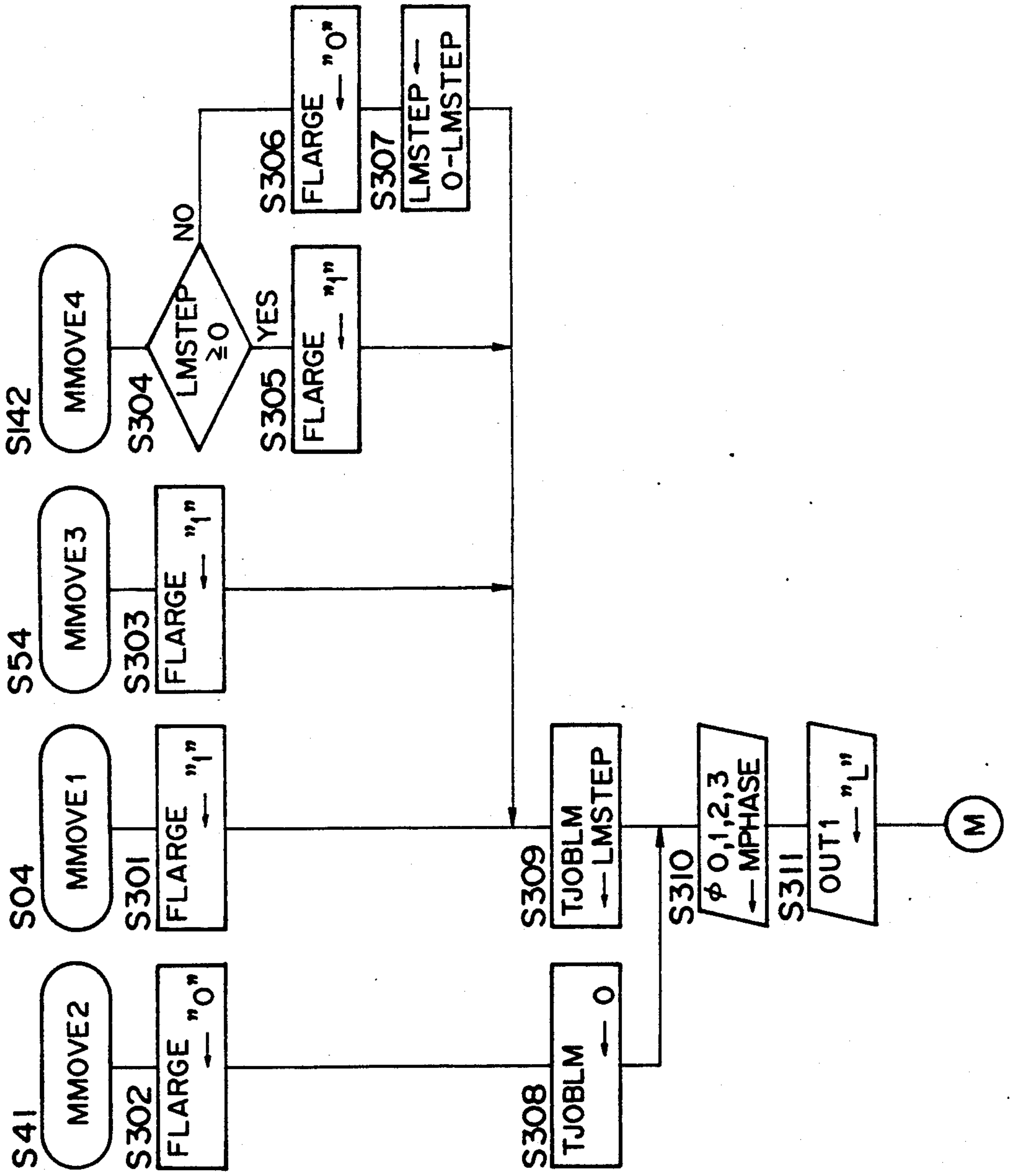

FIG. 10 shows the suroutines for starting to move the mirrors 16 an4 17, which are performed at steps S04, S41, S54 and S142. The subroutine MMOVE1 is for moving the mirrors 16 and 17 in the direction of X by the maximum travel. The subroutine MMOVE2 is for moving the mirrors 16 an 17 in the direction of X' to the home position. The subroutine MMOVE3 is for moving the mirrors 16 an 17 in the direction of X to an initial set position. The subroutine MMOVE4 is for moving the mirrors 16 an 17 in accordance with a value store in the memory LMSTEP.

The flag FLARGE which is set to "1" or reset to "0" at steps S301, S302, S303, S305 an S306 during positioning the mirrors 16 an 17 indicates a movement of the mirrors 16 an 17 in the direction of X when it is "1", an indicates a movement in the direction of X' when it is "0". The processes at steps S304 an S307 are the same as the processes at steps S204 an S207. When it is judge at step S304 that a value LMSTEP is smaller than "0", the flag is set to "0" at step S306, an the memory LMSTEP is renewed with the absolute value of LMSTEP at step S307.

The processes at step S308 an S309 are to determine whether the completion of a movement of the mirrors 16 an 17 is judge by the home position sensor SE2 or by counting the steps. At step S310, data is set from MPHASE to the ports $\phi 0$, $\phi 1$, $\phi 2$, and $\phi 3$ to determine the initial mirror excitation phase. At step S311, the logical level of the mirror motor selection signal is set to "L" to supply an electric current to the stepping motor M2. Then, the processing goes to steps S212, S213 an S214, an a drive of the stepping motor M2 is realize by interruption of the internal timer with the timer TM2.

Figure 11:
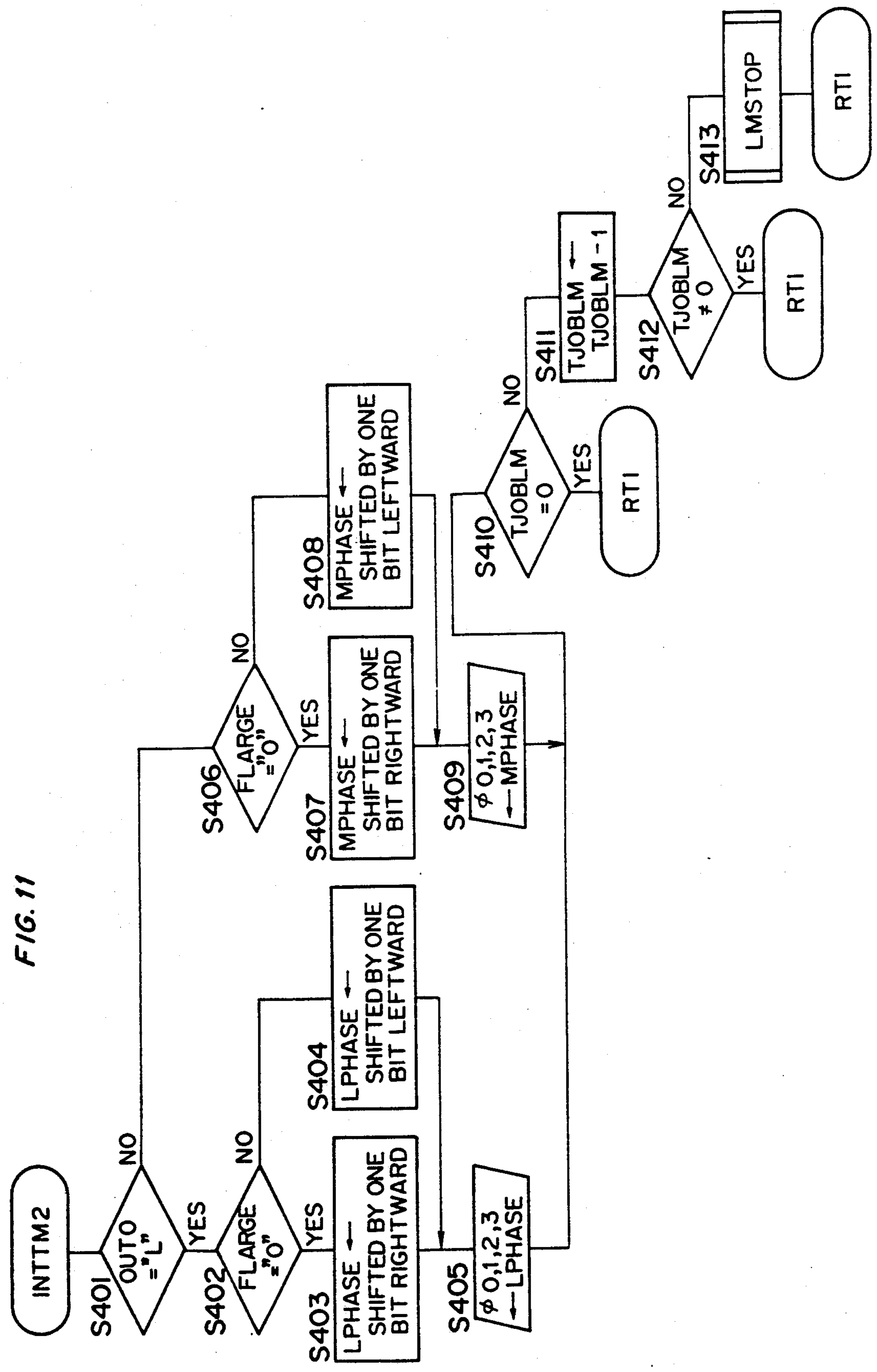

FIG. 11 shows a subroutine for interrupting the internal timer with the timer TM2. The processing process to this subroutine only when the timer TM2 has counted up the pulses in the condition that the timer interruption is allowed (refer to step S213).

It is judge at step S401 whether the logical level of the output port OUT0 is "L" or "H". The "L" level of the output port OUT0 indicates that the lens 15 is moving driven by the stepping motor M1, an the "H" level of the output port OUT0 indicates that the mirrors 16 an 17 are moving driven by the stepping motor M2. When it is judge at step S401 that the logical level of the output port OUT0 is "L", it is judge at step S402 whether the flag FLARGE is "0". When the result at step S402 is "YES", which indicates a movement in the direction of X, the value LPHASE is shifted by one it rightward. For instance, suppose that the current LPHASE value is 0011B, the value will change 0011B→1001B→1100B→0110B→0011B successively. Subsequently, the data is sent from the memory LPHASE to the ports $\phi 0$, $\phi 1$, $\phi 2$ and $\phi 3$ at step S405, an the processing goes to step S410. When the result at step S402 is "0", which indicates a movement in the direction of X', the value LPHASE is shifted by one it leftward at step S404. For instance, suppose that the current LPHASE value is 0011B, the value will change 0011B→0110B→1100B→1001B→0011B. Then, the processing goes to steps S405 an S410.

When it is judge at step S401 that the logical level of the output port OUT0 is "H", which means that the mirrors 16 an 17 are moving, it is judge at step S406 whether the flag FLARGE is "0". When the result at step S406 is "YES", the value MPHASE is shifted by one it rightward at step S404. When the result at step S406 is "0", the value MPHASE is shifted by one it leftward at step S40B. The processes at step S407 an S408 are similar to the processes at steps S403 a S404. Then, the data is sent from the memory MPHASE to the ports $\phi 0$, $\phi 1$, $\phi 2$ and $\phi 3$ at step S409, an the processing goes to step S410.

It is judge at step S410 whether the register TJOBLM is "0". When it is "0", this subroutine is terminated because the stepping motors M1 an M2 are to e stopped opening on the on/off state of the sensors SE1 an SE2. Then, the processing returns to the lens/mirror positioning subroutine. When the register TJOBLM is not "0" at step S410, at step S411, a subtraction "TJOBLM−1" is one, an the register TJOBLM is renewed with the calculate value. Then, the register TJOBLM is checked at step S412 again. When the register TJOBLM is not "0" at step S412, the processing returns to the lens/mirror positioning subroutine. When the register TJOBLM is "0", which means that the motors M1 an M2 have rotate by the number of steps store in the memory LMSTEP, the subroutine LMSTOF for stopping the movements of the lens 15 an the mirrors 16 an4 17 is called at step S413. Thus, the interruption subroutine is complete.

Figure 12:
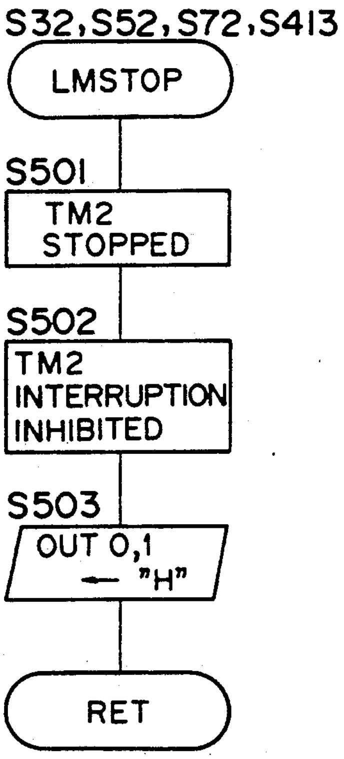

FIG. 12 shows the surotine for stopping movements of the lens 15 an the mirrors 16 an 17, which is performed at steps S32, S52, S72 an S413.

First, the timer TM2 stops counting at step S501, an the interruption of the internal timer with the timer TM2 is inhibited at step S502. Then the logical levels of the output ports OUT1 an OUT2 are set to "H" at step S503 to cut off the electric currents to the stepping motors M1 an M2, an the processing returns to the main routine.

Other Embodiments: FIGS. 14 through 19

Figure 14:
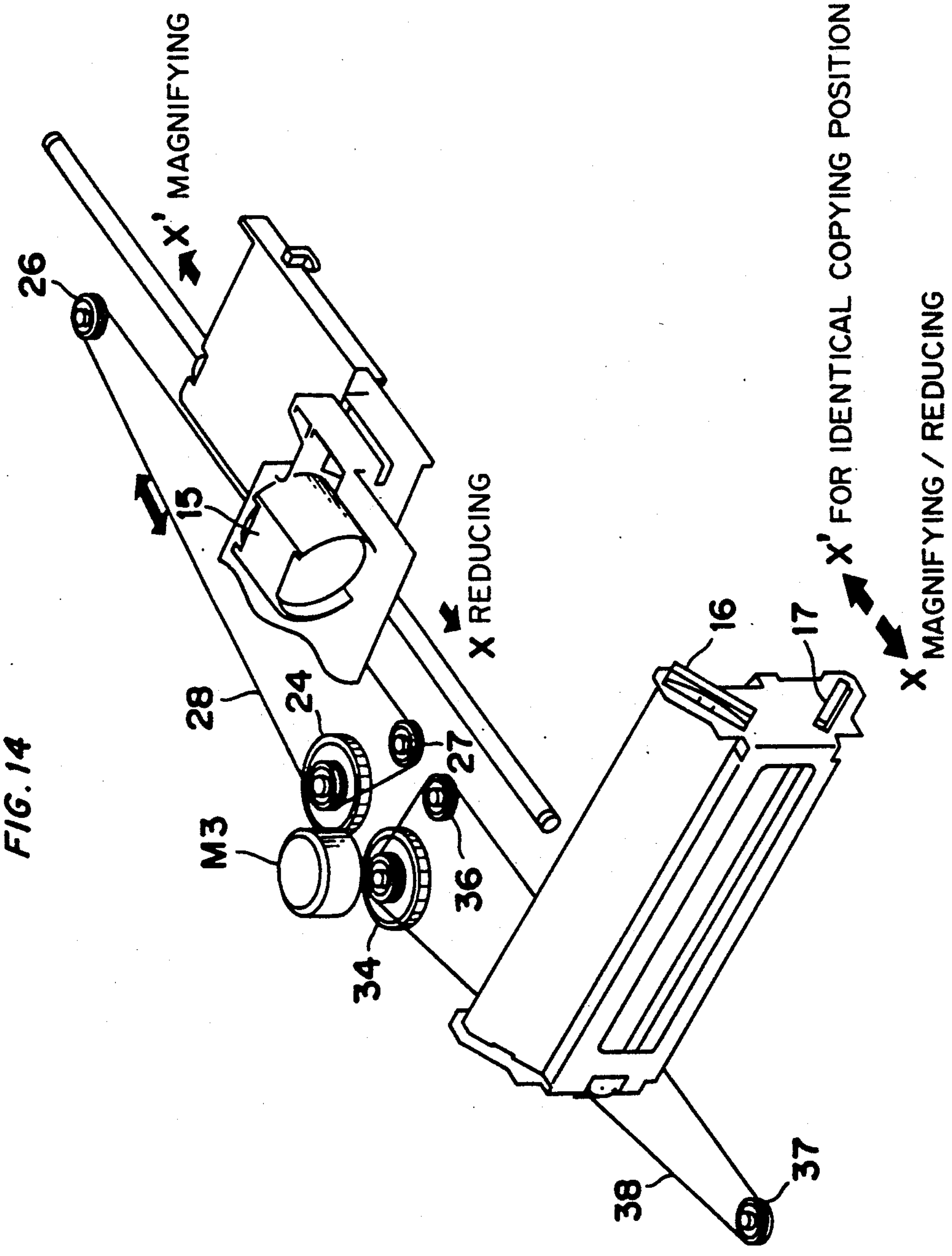
FIG. 14 is a perspective view of a drive mechanism for the lens an the mirrors according to a second embodiment.

FIG. 14 shows a second embodiment of the present invention, in which the lens 15 an the mirrors 16 an 17 are driven by a single stepping motor M3. The gears 24 and 34 for transmitting rotation to the wires 28 and 38 are engage with an output gear (not shown) of the stepping motor M3, an an electromagnetic clutch is provide for each of the gears 24 an4 34. The electromagnetic clutch of the gear 24 is turned on to move the lens 15, an the electromagnetic clutch of the gear 34 is turned on to move the mirrors 16 an 17. Regarding its electric circuit, the stepping motor 3 is always supplied with an electric current, an signals sent from the output ports OUT0 and OUT1 (see FIG. 3) should be signals for commanding turning on an off the electromagnetic clutches.

In the construction, there is a fear that the lens 15 an the mirrors 16 an 17 may move due to vibration when the electromagnetic clutches are turned off. In order to suppress the duration at the time of turning off the electromagnetic clutches, preferably a rake mechanism for preventing time rotation of the electromagnetic clutches is installed in the clutches. Instead of the electromagnetic clutches, a combination of a solenoid an a lever may be applied for switching the drive power. Alternatively, a kick-spring method may be adopted in connecting the gears 24 an 34 to the output gear of the stepping motor M3.

Figure 15:
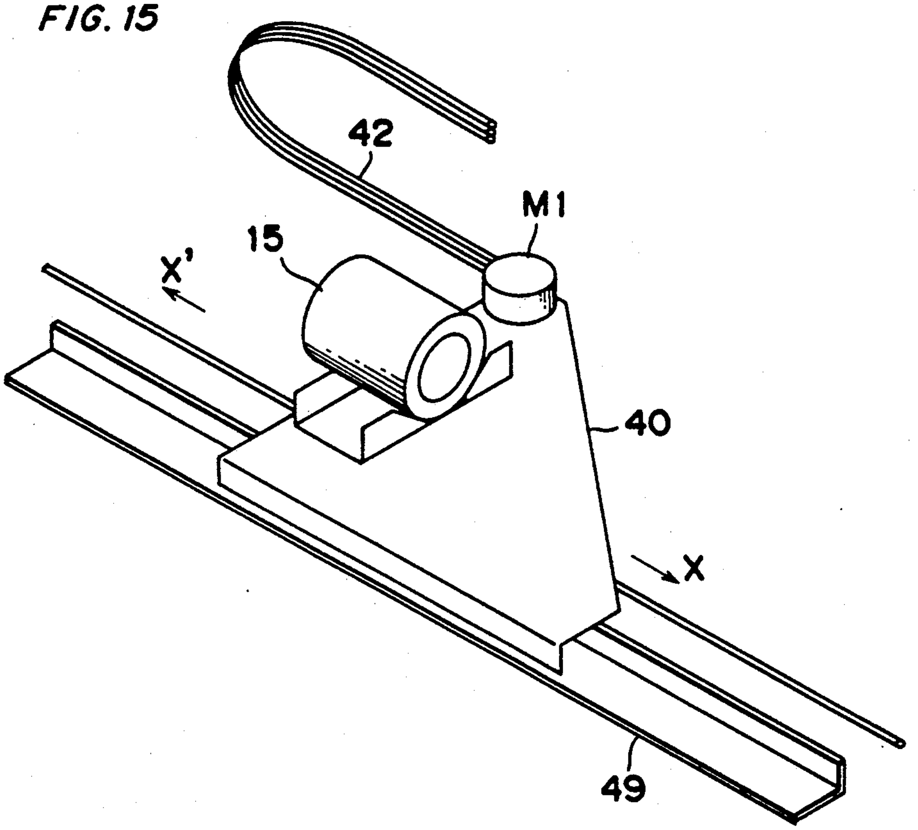
FIG. 15 is a perspective view of a drive mechanism for the lens according to a third embodiment.

FIGS. 15 an 16 show a third embodiment of the present invention, in which the stepping motor M1 is impose on a support 40 of the lens 15. The support 40 has three rollers 41, a since the rollers 41 are engage with a guide rail 49 fixed in the copying machine, the support 40 is movable in the directions indicated by the arrows X and X'. An output gear 23 of the stepping motor M1 is engage with a gear 46 mounted rotatably on the support 40, an further mounted on the support 40 are a pulley 47 which is coaxial with the gear 46 and idle pulleys 48. wire 44 whose ends are fixed is laid among the pulley 47 an the idle pulleys 48. An electric current is supplied to the stepping motor M1 through a flexible cord 42. With forward or reverse rotation of the stepping motor Ml, the gear 46 an the pulley 47 rotate together forward or in reverse, an tension of the wire 44 an friction between the wire 44 an the pulley 47 are converted into power to move the support 40 along the guide rail 49 in the direction X or X'. Thus, the lens 15 moves in the direction or X'.

Figure 17:
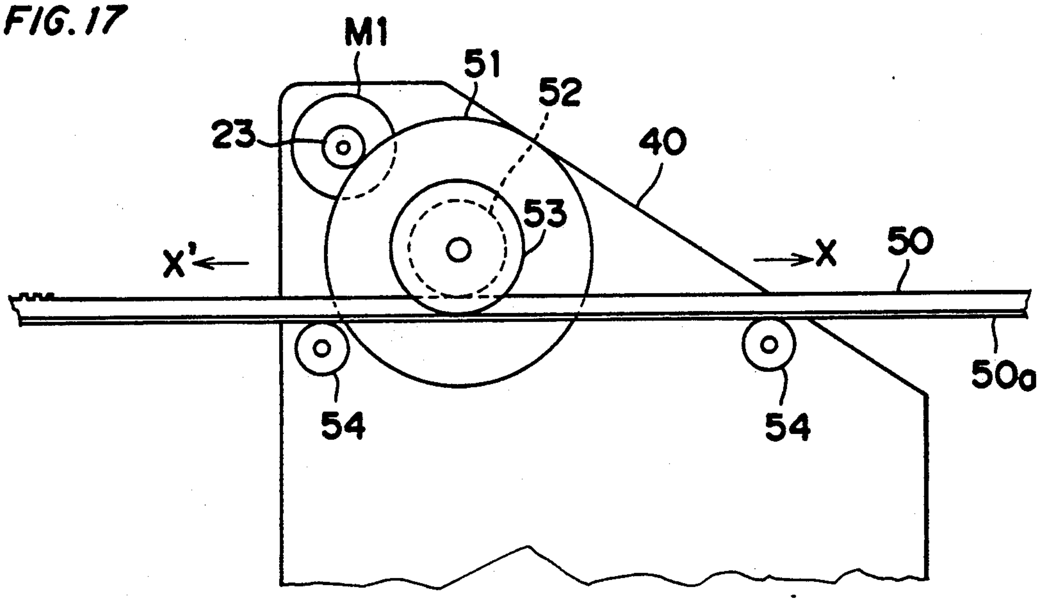
FIG. 17 is a bottom view of a drive mechanism for the lens according to a fourth embodiment.

FIG. 17 shows a fourth embodiment of the present invention, in which a pinion 52 mounted on the support 40 coaxially with a gear 51 is engage with a rack 50 fixed in the copying machine. The gear 51, which is rotatably mounted on the support 40, is engage with the output gear 23 of the stepping motor M1. Pitching 53 mounted on the support 40 coaxially with the pinion 52 an guide rollers 54 are pressed against a rail portion 50*a* of the rack 50, whereby the support 40 is movable in the directions of X and X' along the rail portion 50*a*. With forward or revere rotation of the stepping motor M1, the gear 51 an the pinion 52 rotate together forward or in reverse, an the pinion 52 moves along the rack 50, followed a movement of the support 40 along the rail portion 50*a*. Thus, the lens 15 moves in the direction of X or X' along the rail portion 50*a*.

Figure 18:
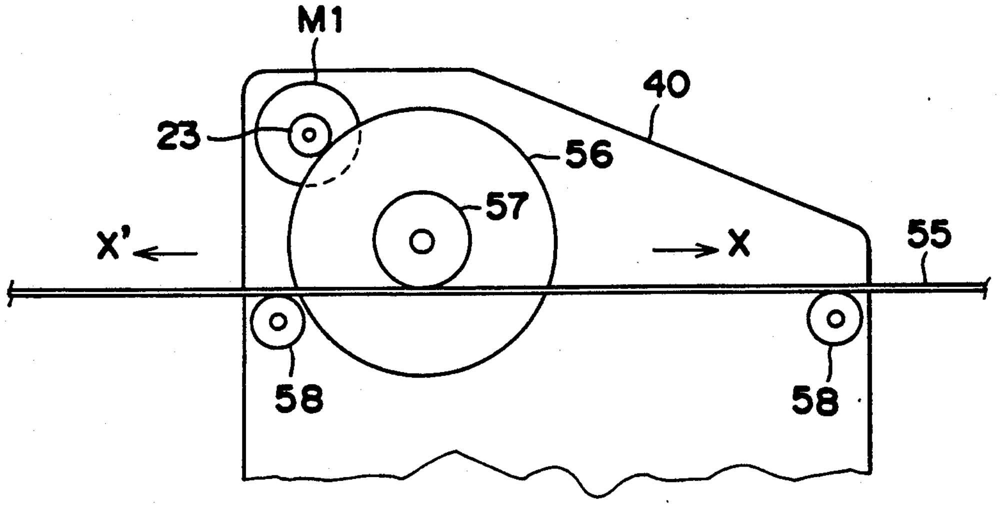
FIG. 18 is a bottom view of a drive mechanism for the lens according to a fifth embodiment; an FIG. 19 is a bottom view of a drive mechanism for the lens according to a sixth embodiment.

FIG. 18 shows a fifth embodiment of the present invention, in which a driving roller 57 an guide rollers 58 which are mounted on the support 40 are engage with a guide rail 55 fixed in the coping machine. The guide rollers 58 are rotatably mounted on the support 40, an the driving roller 57 is coaxial with a gear 56 which is rotatably mounted on the support 40. The gear 56 is engaged with the output gear 23 of the stepping motor M1. The roller 57 is made of a material whose friction coefficient is large so that friction between the roller 57 an the guide rail 55 will e large. With forward or reverse rotation of the stepping motor M1, the roller 57 rotates together with the gear 56 forward or in reverse an moves along the guide rail 55, where the support 40 supporting the lens 15 moves in the direction X or X' along the guide rail 55. preferably. the guide rollers 58 have a large friction coefficient an are pressed against the guide rail 55 by an elastic member.

Figure 19:
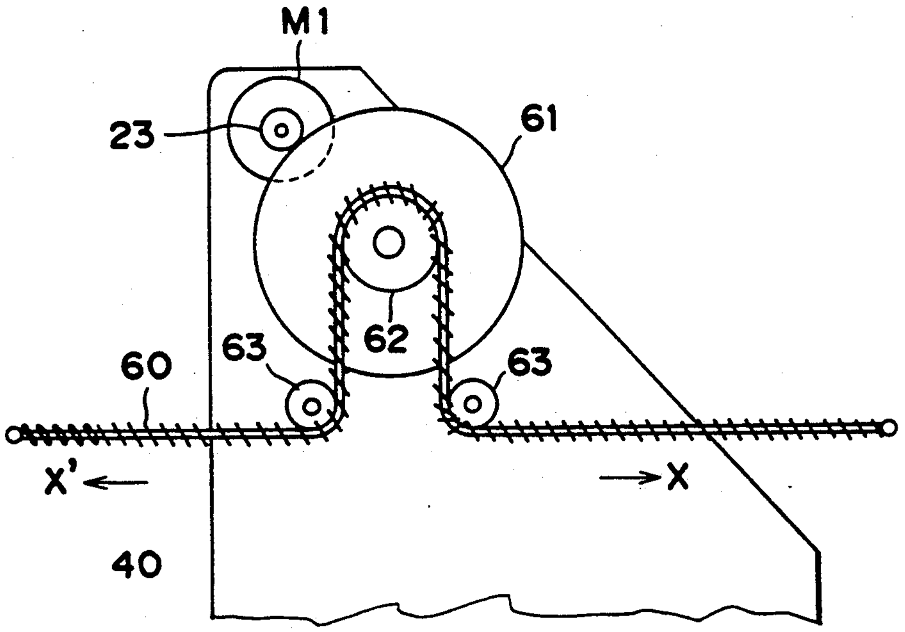

FIG. 19 shows a sixth embodiment of the present invention, in which a mesh rope 60 is use as a drive force transmitter. The rope 60, whose both ends are fixed in the copying machine, is laid among a driving pulley 62 mounted on the support 40 coaxially with a gear 61 an idle pulleys 63 rotatably mounted on the support 40. The gear 61 is rotatably mounted on the support 40 an engage with the output gear 23 of the stepping motor M1. By applying appropriate tension to the rope 60, the support 40 supporting the lens 15 moves in the directions of X and X' with forward or reverse rotation of the stepping motor M1 without using a rail.

As a modification of the sixth embodiment, it is possible that a chain, a timing belt or a sprocket wheel is use as a drive force transmitter instead of a combination of the mesh rope 60 an the driving pulley 62. Regarding the third embodiment shown in FIGS. 15 an 16, if the wire 44 is supplied with sufficient tension, the guide rail 49 will be unnecessary.

Further, it is note that various modifications of the drive mechanism as described above can be applied to the drive mechanism for moving the mirrors 16 an 17.

Although the present invention has been described in connection with the embodiment above, it is to be note that various changes an modifications are apparent to those who are skilled in the art. Such changes an modifications are to be understood as include within the scope of the present invention define by the appended claims, unless being separate therefrom.

What is claimed is:

1. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

inputting means for inputting the actual focal length of the uni-focus projection lens;

setting means for setting a magnification ratio;

first drive means for moving the projection lens;

second drive means for moving the reflection member; and control means for independently moving the first drive means and the second drive means according to a set magnification ratio and the input focal length of the projection lens.

2. An electrophotographic machine as claimed in claim 1, further comprising:

first detection means for detecting that the projection lens is at its home position; and second detection means for detecting that the reflection member is at its home position.

3. An electrophotographic machine as claimed in claim 2, wherein a switch member is used as said first detection means and as said second detection means.

4. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for calculating moving amounts of the projection lens and the reflection member according to a set magnification ratio and the focal length of the projection lens and for independently controlling the first drive means and the second drive means according to the calculated moving amounts of the projection lens and the reflection member.

5. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the first drive means to move the projection lens according to a set magnification ratio, and the controlling the second drive means to move the reflection member according to the movement of the projection lens, so as to avoid collision of the projection lens and the reflection member.

6. A electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the second drive means to move the reflection member according to a set magnification ratio, and then controlling the first drive means to move the projection lens according to the movement of the reflection member, so as to avoid collision of the projection lens and the reflection member.

7. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the first drive means to move the projection lens according to a set magnification ratio and the focal length of the projection lens, and then controlling the second drive means to move the reflection member according to the movement of the projection lens, so as to avoid collision of the projection lens and the reflection member.

8. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the second drive means to move the reflection member according to a set magnification ratio and the focal length of the projection lens, and then controlling the first drive means to move the projection lens according to the movement of the reflection member, so as to avoid collision of the projection lens and the reflection member.

9. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the first stepping motor to rotate, in order to move the projection lens, by a calculated number of steps in accordance with a set first magnification ratio an the focal length of the projection lens;

calculation means for calculating a second magnification ratio according to the travel of the projection lens controlled by the first control means; an second control means for controlling the second stepping motor to rotate, in order to move the reflection member, by a calculated number of steps in accordance with the second magnification ratio.

10. An eleotrophotographic machine as claimed in claim 98, in which the first stepping motor is identical to the second stepping motor to move either the projection lens or the reflection member by switching a drive force transmission mechanism.

11. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the second stepping motor to rotate, in order to move the reflection member, by a calculate number of steps in accordance with a set first magnification ratio an the focal length of the projection lens;

calculation means for calculating a second magnification ratio according to the travel of the reflection member controlled by the first control means; an second control means for controlling the first stepping motor to rotate, in order to move the projection lens, by a calculated number of steps in accordance with the second magnification ratio.

12. An eleotrophotographic machine as claimed in claim 11, in which the first stepping motor is identical to the second stepping motor to move either the projection lens or the reflection member stitching a drive force transmission mechanism.

13. An electrophotographic machine for projecting an image of an original on a photosensitive medium at a predetermined magnification ratio, comprising:

a reflection memory for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the first stepping motor to rotate, in order to move the projection lens, by a calculate number of steps in accordance with a set magnification ratio an the focal length of the projection lens;

calculation means for calculating the theoretical conjugate length at the set magnification ratio from the travel of the projection lens controlled by the first control means; and second control means for controlling the second stepping motor to rotate, in order to move the reflection member, by a calculated number of steps in accordance with the calculate theoretical conjugate length.

14. An electrophotographic machine for projecting an image of an original on a photosensitive medium at a predetermined magnification ratio, comprising:

a reflection member for forming an optical projection path to project an original image on a photosensitive medium, the reflection member being movable to change the length o the optical projection path;

a uni-focus projection lens movable in the optical projection path;

a first stepping motor for moving the projection lens;

a second stepping motor for moving the reflection member;

first control means for controlling the second stepping motor to rotate, in order to move the reflection member, by a calculate number of steps in accordance with a set magnification ratio an the focal length of the projection lens;

calculation means for calculating the theoretical lens forward length at the set magnification ratio from the travel of the reflection member controlle by the first control means; and second control means for controlling the first stepping motor to rotate, in order to move the projection lens, by a calculated number of steps in accordance with the calculate theoretical lens forward length.

15. An electrophotographic machine for projecting an image of an original on a photosensitive medium at a p predetermined magnification ratio, comprising:

a reflection member for forming an optical projection path to project an original image on a photosensitive medium, the reflection member being movable to change the length of the optical projection path;

a uni-focus projection lens movable in the optical projection path;

a stepping motor for moving selectively the projection lens an the reflection member;

first control means for controlling the stepping motor to rotate, in order to move the projection lens, by a calculate number of steps in accordance with a set magnification ratio and the focal length of the projection lens;

calculation means for calculating the theoretical conjugate length at the set magnification ratio from the travel of the projection lens controlle by the first control means; an second control means for controlling the stepping motor to rotate, in order to move the reflection member, by a calclated number of steps in accordance with the calculate theoretical conjugate length.

16. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a stepping motor for moving selectively the projection lens an the reflection member first control means for controlling the stepping motor to rotate, in order to move the reflection member, a calculate number of steps in accordance with a set magnification ratio an the focal length of the projection lens;

calculation means for calculating the theoretical lens forward length at the set magnification ratio from the travel of the reflection member controlled by the first control means; and second control means for controlling the stepping motor to rotate, in order to move the projection lens, by a calculate number of steps in accordance with the calculate theoretical lens forward length.

17. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member;

setting means for setting a magnification ratio; and control means for controlling, when the magnification is changed from a reduced magnification ratio to an expanded magnification ratio and from an expanded magnification ratio to a reduced magnification ratio, the second drive means to directly move the reflection member to a position corresponding to a newly-set magnification ratio without passing a home position for a full-size magnification.

* * * * *

UNITED STATES PATENT AND TRADEMARK OFFICE

CERTIFICATE OF CORRECTION

PATENT NO. : 5,113,218

DATED : May 12, 1992

INVENTOR(S) : Takeshi Morikawa

It is certified that error appears in the above-identified patent and that said Letters Patent is hereby corrected as shown below:

Title page should be deleted to appear as per attached title page.

Columns 1-24 should be deleted to appear as per attached Columns 1-24

Signed and Sealed this

Tenth Day of November, 1992

*Attest:*

DOUGLAS B. COMER

*Attesting Officer*

*Acting Commissioner of Patents and Trademarks*

United States Patent [19]
Morikawa et al.
[11] Patent Number: 5,113,218
[45] Date of Patent: May 12, 1992

[54] ELECTROPHOTOGRAPHIC MACHINE WITH CONTROL MEANS RESPONSIVE TO SET MAGNIFICATION RATIO AND FOCAL LENGTH

[75] Inventors: Takeshi Morikawa, Toyokawa; Shinya Matsuda, Kyoto, both of Japan

[73] Assignee: Minolta Camera Kabushiki Kaisha, Osaka, Japan

[21] Appl. No.: 624,330

[22] Filed: Dec. 4, 1990

[30] Foreign Application Priority Data

Dec. 4, 1989 [JP] Japan .................................. 1-315579
Dec. 4, 1989 [JP] Japan .................................. 1-315580

[51] Int. Cl.[5] .............................................. G03B 27/34
[52] U.S. Cl. .......................................... 355/56; 355/55; 355/243
[58] Field of Search ............... 355/243, 232, 228, 210, 355/55, 56, 61, 57; 359/212

[56] References Cited

U.S. PATENT DOCUMENTS

Re. 32,424 5/1987 Takenaka et al. .................... 355/55
4,295,736 10/1981 Ikeda .................................. 355/57
4,501,490 2/1985 Miyamoto et al. .................. 355/55
4,571,061 2/1986 Osanai et al. .
4,676,631 6/1987 Kosugi et al. ......................... 355/55
4,922,087 5/1990 Nakajima et al. ................ 355/56 X

*Primary Examiner*—A. T. Grimley
*Assistant Examiner*—Sandra L. Brasé
*Attorney, Agent, or Firm*—Price, Gess & Ubell

[57] ABSTRACT

Disclosed is a copying machine employing a uni-focus projection lens in which the lens and a mirror for changing the conjugate length are driven to move independently according to a set magnification ratio and the focal length of the lens. Either the lens or the mirror is moved by a stepping motor according to a set first magnification ratio and the focal length of the lens. Calculated from the travel of either the lens of the mirror is a second magnification ratio, and the other one of the mirror and the lens is moved according to the second magnification ratio. In another way, first the lens is moved according to the set magnification ratio and the focal length of the lens. Calculated from the travel of the lens is the theoretical conjugate length at the set magnification ratio, and the mirror is moved according to the theoretical conjugate length. In another way, first the mirror is moved according to the set magnification ratio and the focal length of the lens. Calculated from the travel of the mirror is the theoretical lens forward length at the set magnification ratio, and the lens is moved according to the theoretical lens forward length.

17 Claims, 21 Drawing Sheets

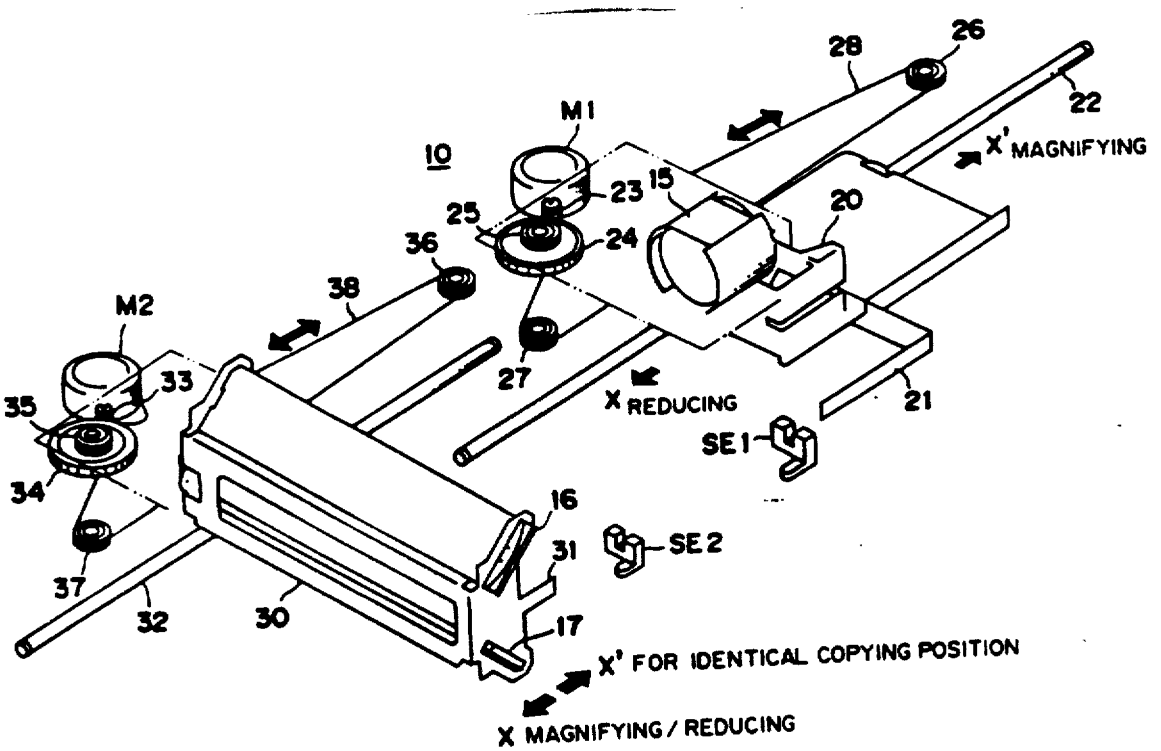

ELECTROPHOTOGRAPHIC MACHINE WITH CONTROL MEANS RESPONSIVE TO SET MAGNIFICATION RATIO AND FOCAL LENGTH

BACKGROUND OF THE INVENTION

1. Field of the Invention

The present invention relates to an electrophotographic machine, and more particularly to an electrophotographic machine wherein an original image is projected on a photosensitive medium at a predetermined magnification ratio so that a magnified or reduced copy is obtained.

2. Description of Related Art

Generally, in an electrophotographic machine having an optical system employing a uni-focus lens as a projection lens, it is necessary for a change in magnification not only to move the lens to a certain position to adjust the magnification in the direction perpendicular to the scanning direction (widthwise direction) but also to move the reflection member (mirror) to a certain position in accordance with the conjugate length. Conventionally, a stepping motor has been usually used as a common drive power source for the above-described movements of the lens and the reflection member, and a cam has been used for adjusting the travels of the lens and the reflection member. In more detail, a stepping motor is rotated at a certain angle to move the lens according to a magnification ratio, and a cam linked to a rotary force transmission mechanism provided for the stepping motor moves the reflection member.

In practice, uni-focus lenses even in the same production line have their respective own characteristics due to errors in assembly and vary in focal length in a certain range. Since the lens is directly driven by the stepping motor, it is possible to control the movement of the lens in accordance with its focal length. In order to control the movement of the reflection member in accordance with the focal length of the lens, it is necessary to design and prepare a cam having a special configuration corresponding with the focal length of the lens. However, cams for a model are produced only in a limited number of kinds in order to avoid any increase in production cost attributed to possible complication of control data and increase of parts in kind. Hence, in reality, it is impossible to control the movement of the reflection member in accordance with the focal length of the lens. When a cam and a cam follower are used, a significant amount of torque loss will take place, and the load on the motor will increase.

There is another problem in changing magnification in that the mutual adjustment between focus and magnification is complicated. When it is detected that the lens and the reflection member are set well as regards to focus but poorly as regards to magnification, the lens should be moved, which movement causes a movement of the reflection member, and the focus will be lost. It is therefore necessary to repeat the above-mentioned operation until correct focus and magnification are obtained, which is a complicated procedure.

To eliminate the above problems, there is a scheme of driving the projection lens and the reflection member independently with separate stepping motors. In this case, however, since the smallest unit of the travels of the projection lens and the reflection member is one step of the respective motors, there will be errors in moving the lens and the reflection member by at most a half of the amount corresponding to one step of the respective motors. The above-mentioned errors deteriorate the optical accuracy in focus and magnification.

SUMMARY OF THE INVENTION

It is therefore an object of the present invention to provide an electrophotographic machine having an optical system in which positioning of a lens and a reflection member to change magnification is performed accurately in consideration of the error of the projection lens in focal length and in a simple procedure.

In order to achieve the object, an electrophotographic machine according to the present invention comprises a movable reflection member for forming an optical projection path to project an original image on a photosensitive medium, a uni-focus projection lens movable in the optical projection path formed by the reflection member, first drive means for moving the projection lens, second drive means for moving the reflection member, and control means for independently moving the first drive means and the second drive means in accordance with a set magnification ratio and the focal length of the projection lens.

In the construction, the error in the focal length of the lens is figured out beforehand, and the travels of the lens and the reflection member to change the magnification to a set value are calculated taking the error of the lens in focal length into account. According to the thus calculated values, the lens and the reflection member are moved independently to the most appropriate positions for a set magnification ratio. The movement of a reflection member, which has been conventionally driven by a cam following the movement of a projection lens, according to the present invention, can be controlled independently of the movement of the projection lens, whereby accuracy in changing the conjugate length is significantly improved.

Slight errors in moving the projection lens and the reflection member are caused by using stepping motors. In the present invention, either an error in moving the projection lens or an error in moving the reflection member is corrected before a movement of the other in order either to focus or to obtain accurate magnification so that more accurate performance of the optical system is achieved.

In focusing prior to obtaining accurate magnification, the projection lens is moved to focus at a magnification ratio set by an operator, and the reflection lens is moved in accordance with a secondary value of magnification calculated from the actual travel of the projection lens. In another way, the reflection member is moved in accordance with the magnification ratio set by the operator, and the projection lens is moved to focus in a secondary value of magnification calculated from the actual travel of the reflection lens.

In obtaining accurate magnification prior to focusing, the projection lens is moved to focus at a magnification ratio set by an operator, and the reflection member is moved in accordance with a theoretical conjugate length at the magnification ratio, which conjugate length is calculated from the actual travel of the projection lens. In another way, the reflection member is moved in accordance with the magnification ratio set by an operator, and the projection lens is moved in accordance with a theoretical lens forward length at the magnification ratio, which lens forward length is calculated from the actual travel of the reflection member.

BRIEF DESCRIPTION OF THE DRAWINGS

Figure 16:
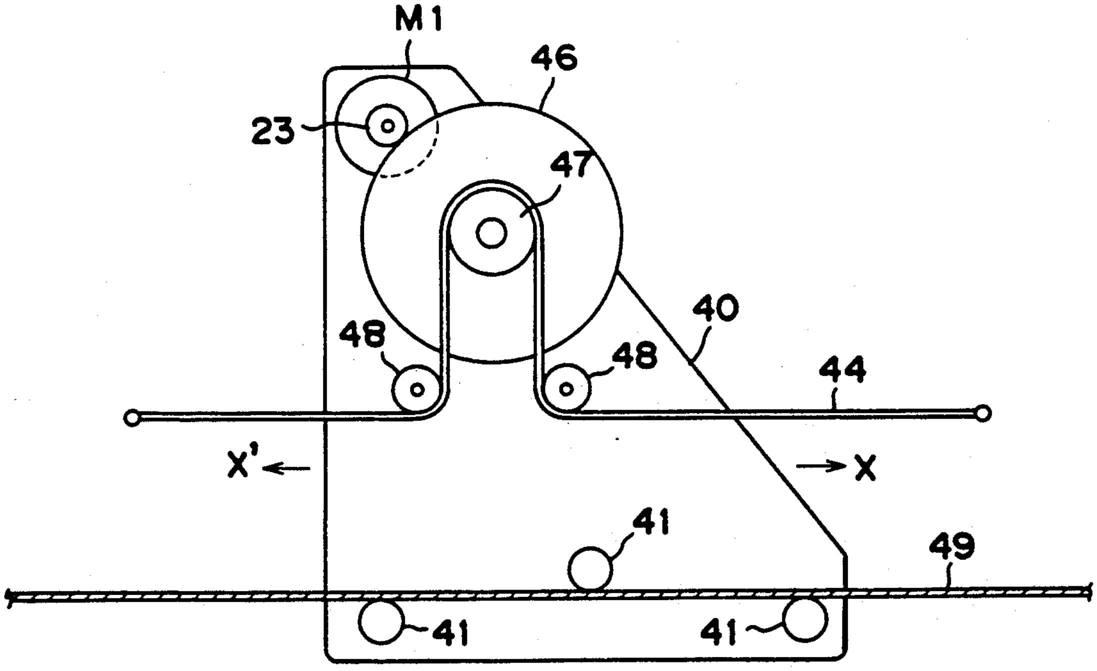
FIG. 16 is a bottom view of the drive mechanism shown in FIG. 15.

These and other objects and features of the present invention will become apparent from the following description taken in conjunction with the preferred embodiments thereof with reference to the accompanying drawings, in which:

FIGS. 1 through 13 show a first embodiment according to the present invention;

FIG. 1 is a schematic view of a copying machine;

FIG. 2 is a perspective view of a drive mechanism for driving a projection lens and mirrors;

FIG. 3 is a block diagram of an optical system control circuit;

FIG. 4 is a block diagram of a motor driving circuit;

FIGS. 5a and 5b are views of the lens and the mirrors showing the movements;

FIG. 6 is a view of the mirrors showing the movements;

FIG. 7 is a flowchart of a main routine of a microcomputer for controlling the optical system;

FIGS. 8a through 8e are flowcharts of a subroutine for positioning the lens and the mirrors performed in the main routine shown in FIG. 7;

FIG. 9 is a flowchart of a subroutine for moving the lens performed in the subroutine shown in FIGS. 8a through 8e;

FIG. 10 is a flowchart of a subroutine for moving the mirrors performed in the subroutine shown in FIGS. 8a through 8e;

FIG. 11 is a flowchart of a subroutine for interrupting the timer performed in the subroutine shown in FIGS. 8a through 8e;

FIG. 12 is a flowchart of a subroutine for stopping the movements of the lens and the mirrors performed in the subroutine shown in FIGS. 8a through 8e and FIG. 11;

FIG. 13 is a perspective view of a modified drive mechanism for the lens and the mirrors;

FIG. 14 is a perspective view of a drive mechanism for the lens and the mirrors according to a second embodiment;

FIG. 15 is a perspective view of a drive mechanism for the lens according to a third embodiment;

FIG. 16 is a bottom view of the drive mechanism shown in FIG. 15;

FIG. 17 is a bottom view of a drive mechanism for the lens according to a fourth embodiment;

FIG. 18 is a bottom view of a drive mechanism for the lens according to a fifth embodiment; and FIG. 19 is a bottom view of a drive mechanism for the lens according to a sixth embodiment.

DETAILED DESCRIPTION OF THE PREFERRED EMBODIMENTS

The following describes exemplary copying machines embodying the principles and features of the present invention in reference with the accompanying drawings.

First Embodiment: FIGS. 1 through 13

FIG. 1 is a schematic view of a copying machine having a fixed original table and a moving optical system. A photosensitive drum 1 can be driven to rotate in the direction indicated by the arrow (a), around which are provided an electrostatic charger 2, and image interval/edge eraser lamp 3, magnetic brush type developing units 4a and 4b, an image transfer charger 5, a sheet separating charger 6, a remaining toner cleaning unit 7, and a remaining electrostatic eraser lamp 8. A copy sheet is supplied from the left in FIG. 1, and transferred in the path as indicated by the chain line. After an image transfer process, the sheet is ejected from the machine by way of an image fixing unit (not shown). Since the construction and operation of each image forming unit are well known, no detailed description of them is provided here.

An optical system 10 is provided below an original table 9, and the optical system 10 comprises an exposure lamp 11, a first mirror 12, a second mirror 13, a third mirror 14, a uni-focus projection lens 15, a fourth mirror 16, a fifth mirror 17 and a sixth mirror 18. An original put on the original table 9 is exposed to light from the exposure lamp 11, and the light reflected on the original is focused on the photosensitive drum 1 by way of the mirrors 12, 13 and 14, the lens 15, and the mirrors 16, 17 and 18. The exposure lamp 11 and the first mirror 12 are integrated in a unit, while the second and the third mirrors 13 and 14 are integrated in another unit. These units move in the direction indicated by the arrow (b) in FIG. 1 to scan the original. At this time, the exposure lamp 11 and the first mirror 12 are driven to move at a speed of v/m (v: peripheral speed of the drum 1, m: magnification ratio), while the second and the third mirrors 13 and 14 are driven to move at a speed of v/2 m. Because the ratio of the speeds of the two units is two to one, the optical path length between the original surface and the projection lens 15 is constant during a scan of the original.

FIG. 1 illustrates the positions of the lens 15 and the fourth and the fifth mirrors 16 and 17 when a magnification ratio is "1". In order to perform a copying operation at a magnification ratio other than "1", the lens 15 is required to move in either the direction of X or the direction of X', and the fourth and the fifth mirrors 16 and 17 are required to move in the direction of X. Supposing that the magnification ratio is "m" and the focal length of the lens 15 is "f", the lens forward length L1 (optical path length between the original surface and the lens 15) and the conjugate length L2 (optical path length between the original surface and the surface of the photosensitive drum 1) can be expressed by the following equations (1) and (2):

$$L1=(1+1/m)\times f \quad (1)$$

$$L2=(2+m+1/m)\times f \quad (2)$$

As obvious from the equations (1) and (2), the lens forward length L1 and the conjugate length L2 vary in accordance with the focal length "f" of the lens 15. Since each lens has its own focal length, the values L1 and L2 at a magnification ratio vary from machine to machine even in the same model, and therefore it is necessary to control the movements of the lens 15 and the mirrors 16 and 17 differently from machine to machine. Conventionally, lenses are preliminarily sorted into several groups, each of which has a certain range, according to the focal length, and the travel of the lens 15 for a change in magnification and the configuration of a cam for moving the mirrors 16 and 17 are determined depending on which group the lens 15 belongs to. In this embodiment, the lens 15, and the mirrors 16 and 17 are driven by a stepping motor M1 and a stepping motor M2 respectively.

Referring to FIG. 2, the projection lens 15 is mounted on a rail 22 via a frame 20 and made movable in the directions indicated by the arrows X and X'. An output gear 23 provided for the stepping motor M1 is engaged with an idle gear 24. A wire 28 is laid among a pulley 25 fixed coaxially to the idle gear 24, a pulley 26 and a pulley 27, and a part of the wire 28 is fixed to the frame 20. A sensor SE1 which is turned on and off by a protrusion 21 is provided on the frame 20 to detect whether the lens 15 is at the home position. The mirrors 16 and 17 are provided on a rail 32 via a frame 30 movably in the directions indicated by the arrows X and X'. A drive unit for the mirrors 16 and 17 has the same construction as that for the lens 15, and the drive unit comprises the stepping motor M2, an output gear 33, a gear 34, pulleys 35, 36 and 37, and a wire 38. A sensor SE2 for detecting whether the mirrors 16 and 17 are at the home position is turned on and off by a protrusion 31 disposed on the frame 30.

FIG. 3 is a block diagram showing control circuitry of a microcomputer 60 for controlling the optical system 10 having the above-mentioned construction. The microcomputer 60 receives signals from a master microcomputer (not shown) for controlling all the units of the copying machine except for the optical system 10, that is, controlling the operation panel, the image forming unit and the sheet feeding unit, and the microcomputer 60 controls the movements of the lens 15 and the mirrors 16 and 17 accordingly.

The microcomputer 60 comprises an input port 61, an ROM 62, an RAM, a register 63, a control processing unit 64, a generator 65 for generating a clock signal f CLK, a timer unit 66 and an output port 67. Input to the input port 61 are a signal transmitted from the master microcomputer representing a magnification ratio MAG set by an operator, a signal SCAN demanding the optical system 10 to start a scan, data on the focal length "f" of the lens 15, data for moving the lens 15 to an initial set position, data for moving the mirrors 16 and 17 to an initial set position, a signal LHOME transmitted from the lens home position sensor SE1 and a signal MHOME transmitted from the mirror home position sensor SE2. Output from the output port 67 are signals $\phi 0$, $\phi 1$, $\phi 2$ and $\phi 3$, a lens motor selection signal, a mirror motor selection signal, scan signals for controlling an image scan by the optical system 10, a signal READY informing the master microcomputer of the completion of positioning of the lens 15 and the mirrors 16 and 17 which is required in cases of turning on the machine and changing the magnification.

FIG. 4 shows a drive circuit of the stepping motors M1 and M2. Input terminals of transistors Q1E and Q2E are connected to ports OUT0 and OUT1 of the output port 67, and a direct current is supplied to each of the motors M1 and M2 when the logical levels at the ports OUT0 and OUT1 are "L". For instance, by successively changing the excitation phases of $\phi 0$, $\phi 1$, $\phi 2$ and $\phi 3$ when the logical level is "L", the stepping motor M1 for moving the lens 15 rotates.

The following describes a method of figuring out positions where the lens 15 and the mirrors 16 and 17 are to be set at a magnification ratio, referring to FIGS. 5a and 5b.

Suppose that the magnification ratio is "m" (m>0), the focal length is "f" (f>0), and a defocusing amount (lens aberration) is "D" (D>0), the lens position "x" can be expressed by the following equation (3), where the lens position "x" is represented by "0" when the magnification ratio "m" is "1".

$$x = f\times\frac{m-1}{m} - \frac{m-1}{m+1}\times\frac{D}{2} \quad (3)$$

In order to express the lens position in a positive number at any magnification ratio ranging from 0.500 to 2.000, the lens position at the minimum magnification ratio of 0.500 should be represented by "0", and a value "MAG×0.001" (MAG is a value set by an operator as a magnification ratio, and the data is transmitted from the master microcomputer) should substitute for the magnification ratio "m". Also, in order to express the lens position in an integer at any magnification ratio, the lens position should be represented by a number of steps by which the stepping motor M1 is rotated in order to move the lens 15 to the position. Supposing that the travel of the lens 15 per pulse of the stepping motor M1 is "a", a lens position value LPOS1 can be expressed by the following equation (4).

$$LPOS1 = \frac{f}{a}\left(10^3 - \frac{10^6}{MAG}\right)\times 10^{-3} + \left(\frac{10^3 - MAG}{MAG + 10^3}\right)\times\frac{D}{2a} - \frac{f}{a}\left(10^3 - \frac{10^6}{500}\right)\times 10^{-3} - \left(\frac{10^3 - 500}{500 + 10^3}\right)\times\frac{D}{2a} \quad (4)$$

The position "x" of the mirrors 16 and 17 can be expressed by the following equation (5), where the mirror position is represented by "0" when the magnification ratio is "1".

$$x = \left(m - 2 + \frac{1}{m}\right)\times\frac{f}{2} \quad (5)$$

When a value "MAG×0.001" (MAG is a value set by an operator as a magnification ratio, and the data is transmitted from the master microcomputer) substitutes for the magnification ratio "m", a mirror position value MPOS1 at a set magnification ratio MAG can be expressed by the following equation (6).

$$MPOS1 = \left(MAG\times 10^{-3} - 2 + \frac{10^3}{MAG}\right)\times\frac{f}{2a} \quad (6)$$

In this embodiment, the lens position value LPOS1 and the mirror position value MPOS1 at a set magnification ratio MAG in accordance with the focal length "f" are calculated referring to the equations (4) and (6). Then, the stepping motors M1 and M2 are independently driven according to the calculated values to move the lens 15 and the mirrors 16 and 17 to the respective determined positions. In positioning the lens 15 and the mirrors 16 and 17 to increase the magnification, the lens 15 is moved before the mirrors 16 and 17. On the contrary, in positioning the lens 15 and the mirrors 16 and 17 to reduce the magnification, the mirrors 16 and 17 are moved before the lens 15. This scheme is to avoid a collision between the lens unit and the mirror unit. Regarding a movement of the mirrors 16 and 17, a current mirror position value is stored in the RAM 63, and the difference between the current mirror position value and a mirror position value at a newly set magnification ratio is figured out, and the mirrors 16 and 17 are moved directly to the position corresponding with the new magnification ratio without returning to the home position. Referring to FIG. 6, the mirrors 16 and 17 move not in the mode (c) but in the mode (d), which is the shortest way where the mirrors 16 and 17 are positioned in the shortest time.

FIG. 13 shows a modification of the drive mechanism for the lens and the mirror units, in which a sensor SE3 is commonly used for detecting whether the lens 15 is at the home position and detecting whether the mirrors 16 and 17 are at the home position. Both the protrusion 21 of the lens unit and the protrusion 31 of the mirror unit can advance to and retreat from the optical axis of the sensor SE3.

The control of the operation is hereinafter described with reference to the flowcharts in FIGS. 7 through 12.

FIG. 7 shows a main routine of the microcomputer 60.

When the machine is supplied with power to start a program, the output port 67 and the RAM 63 are initialized at step S1, and an internal timer is set at step S2. The internal timer is for determining the processing time for one cycle of the main routine. Clock signals f CLK generated by the generator 65 are counted by the timer unit 66. Then a subroutine for positioning the lens 15 and the mirrors 16 and 17 is called at step S3, and a subroutine for scanning an original with the optical system 10 is called at step S4. When it is confirmed at step S5 that the internal timer has expired, the processing returns to step S2 to repeat the processes at steps S3 and S4.

Referring to FIGS. 8*a* through 8*e*, the lens/mirror positioning subroutine to be performed at step S3 of the main routine is hereinafter described in detail. In this subroutine, a state counter SCLM is checked at step S0, and the processing proceeds in accordance with the count value.

When the count value of the state counter SCLM is "0" (initial state), it is judged at step S01 whether the logical level of a signal MHOME sent from the mirror home position sensor SE2 is "L". The sensor SE2 generates an "L" signal when the protrusion 31 is advancing into the optical axis, and generates an "H" signal when the protrusion 31 retreats from the optical axis. When the logical level of the signal MHOME is "L", which means the protrusion 31 of the mirror unit is advancing into the optical axis of the sensor SE2, at step S02 a value 0011B (B represents a binary number) is stored as an initial value in a memory MPHASE for determining the excitation phase of the stepping motor M2. At step S3, a value MAXMSTEP representing a maximum travel of the mirrors 16 and 17 is stored in a memory LMSTEP for determining the number of steps by which the stepping motors M1 and M2 rotate. Subsequently a subroutine MMOVE1 for moving the mirrors 16 and 17 in the direction indicated by the arrow X by an amount corresponding to a value stored in the memory LMSTEP is called at step S04, and the state counter SCLM gains an increment at step S06, that is, the state counter SCLM is set to "1". Then, the processing returns to the main routine.

When the logical level of the signal MHOME sent from the sensor SE2 is "H" ("NO" at step S01), that is, when the protrusion 31 of the mirrors unit retreats from the optical axis of the sensor SE2, the state counter SCLM is set to "2" at step S05. Then, the processing returns to the main routine.

When the count value of the state counter SCLM is "1", it is judged at step S11 whether a register TJOBLM is "0", that is, whether the movement of the mirrors 16 and 17 in accordance with the maximum value has been completed. The processing repeats the main routine until the value TJOBLM becomes "0". Then, the state counter SCLM gains an increment (is set to "2") at step S06.

When the count value of the state counter SCLM is "2", it is judged at step S21 whether the logical level of a signal LHOME sent from the sensor SE1 is "L" or "H". When the logical level of the signal LHOME is "L", which means that the protrusion 21 of the lens unit is advancing into the optical axis of the sensor SE1, at step S22 a binary number 0011B is stored as an initial value in a memory LPHASE for determining the excitation phase of the stepping motor M1. Then, a subroutine LMOVE1 for moving the lens 15 in the direction indicated by the arrow X' to separate the protrusion 21 from the sensor SE1 is called at step S23, and the state counter SCLM gains an increment (is set to "3") at step S06. On the other hand, when the logical level of the signal LHOME is "H" ("NO" at step S21), which means that the protrusion 21 of the lens unit retreats from the optical axis of the sensor SE1, the state counter is set to "4" at step S24, and the processing returns to the main routine.

When the count value of the state counter SCLM is "3", it is judged at step S31 whether the logical level of the signal LHOME sent from the sensor SE1 is "H", that is, whether the protrusion 21 has retreated from the sensor SE1. The processing repeats the main routine until the logical level of the signal LHOME becomes "H". When the logical level of the signal LHOME is judged to be "H", a subroutine LMSTOP for stopping movements of the lens 15 and the mirrors 16 and 17 is called at step S32. Then, the state counter SCLM gains an increment (is set to "4") at step S06, and the processing returns to the main routine.

Regarding the copying machine having only one sensor SE3 for detecting whether the lens 15 is at the home position and for detecting whether the mirrors 16 and 17 are at the home position, positioning of the lens 15 must be performed in a state that the protrusion 31 of the mirror unit retreats from the optical axis of the sensor SE3, and positioning of the mirrors 16 and 17 must be performed in a state that the protrusion 21 of the lens unit retreats from the optical axis of the sensor SE3. For this reason, the above-described processes are performed. However, in the machine having separate sensors SE1 and SE2 for detecting whether the lens 15 is at the home position and for detecting whether the mirrors 16 and 17 is at the home position, these processes can be eliminated.

When the count value of the state counter SCLM is "4", a subroutine MMOVE2 for moving the mirrors 16 and 17 in the direction indicated by the arrow X' to the home position is called at step S41, and the state counter SCLM gains an increment (is set to "5") at step S06.

When the count value of the state counter SCLM is "5", upon the confirmation at step S51 of the logical level of the signal MHOME sent from the sensor SE2 to be "L", which means the arrival of the mirrors 16 and 17 at the home position, the subroutine LMSTOP performed at step S32 is called at step S52 to stop the movement of the mirrors 16 and 17.

In this embodiment, when the machine starts to be supplied with power, the lens 15 and the mirrors 16 and 17 are set to the respective positions to obtain a magnification ratio of 2.000 (the maximum magnification ratio). Therefore at step S52 the number of steps by which the stepping motor M2 is to rotate to move the mirrors 16 and 17 to a position to obtain a magnification ratio of 2.000 is stored in the memory LMSTEP. It is noted that the lens 15 and the mirrors 16 and 17 may be set to the respective positions to obtain any magnification ratio as well as a magnification ratio of 2.000 as an initial set position. In the machine having only one home position sensor SE3, however, initial set positions of the lens 15 and mirrors 16 and 17 must be positions to obtain a magnification ratio larger than 1.000.

Next, a subroutine MMOVE3 for moving the mirrors 16 and 17 in the direction of X in accordance with a value in the memory LMSTEP is called at step S54, and the state counter SCLM gains an increment (is set to "6") at step S06.

When the count value of the state counter SCLM is "6", it is judged at step S61 whether the register TJOBLM is "0", that is, whether the movement of the mirrors 16 and 17 is completed. The processing repeats the main routine until the register TJOBLM becomes "0". When the register TJOBLM is judged to be "0", the focal length "f" is entered at step S62. The focal length "f" is used for calculating position values of the lens 15 and the mirrors 16 and 17. The value 2.000 is entered at step S63, and substitutes for MAG in the equation (6) to calculate a mirror position value MPOS1 at a magnification ratio of 2.000. Further, the calculated value MPOS1 is stored in a memory MPOS2 at step S65 so that the value MPOS1 can be compared with a mirror position value at a next set magnification ratio. Thus, initial setting of the mirrors 16 and 17 is completed, and the mirror position value at an initial magnification ratio is obtained. Subsequently, a subroutine LMOVE2 for moving the lens 15 in the direction of X to the home position is called at step S15, and the state counter SCLM gains an increment (set to "7") at step S06.

When the count value of the state counter is "7", upon the confirmation at step S71 of the logical level of the signal LHOME sent from the sensor SE1 being "L", which means the arrival of the lens 15 at the home position, the subroutine LMSTOP performed at steps S32 and S52 is called at step S72. At step S73, a value representing the number of steps by which the stepping motor M1 is to rotate to move the lens 15 to a position to obtain a magnification ratio of 2.000 is stored in the memory LMSTEP. Subsequently, a subroutine LMOVE3 for moving the lens 15 in the direction of X' in accordance with a value in the memory LMSTEP is called at step S74, and the state counter SCLM gains an increment (is set to "8") at step S06.

When the count value of the state counter SCLM is "8", it is judged at step S81 whether the register TJOBLM is "0", that is, whether the lens 15 has moved by the number of steps set at step S73. The processing repeats the main routine until the register TJOBLM becomes "0". When the register TJOBLM is judged to be "0", at step S82 a lens position value LPOS1 at a magnification ratio of 2.000 is calculated referring to the equation (4). The calculated value LPOS1 is stored in a memory LPOS2 at step S83 so that the value can be compared with a lens position value at a next set magnification ratio. The current magnification ratio (2.000) is stored in a memory MAG1 at step S84, and the logical level of the signal READY is set to "L" at step S85. Then, the state counter SCLM gains an increment (is set to "9") at step S06. The logical level of the signal READY is "H" during positioning of the lens 15 and the mirrors 16 and 17, and it is "L" in other conditions. Since the logical level of the signal READY is set to "L" at step S85, the lens 15 and the mirrors 16 and 17 have been set to positions to obtain a magnification ratio of 2.000, and in this state, a copying operation for making a magnified copy of an original in a rate of 2 to 1 is available. In a state that the logical level of the signal READY is "L", when the logical level of the scan demanding signal SCAN sent from the master microcomputer becomes "L", the optical system 10 starts scanning an original at step S4 shown in FIG. 7.

When the count value of the state counter SCLM is "9", a magnification ratio MAG set by an operator and transmitted from the master microcomputer is stored in a memory MAG2. The value of MAG2 is compared with the value of MAG1 (the magnification ratio according to which the lens 15 and the mirrors 16 and 17 are currently positioned). When the values are equal, the processing returns to the main routine. When the values are different, which means that the lens 15 and the mirrors 16 and 17 are required to move, the logical level of the signal READY is set to "H" at step S93. Then, the state counter SCLM gains an increment (is set to "10") at step S06.

When the count value of the state counter SCLM is "10", the magnification ratio MAG2 is stored in the memory MAG at step S101. At step S102 a lens position value LPOS1 at the magnification ratio MAG2 is calculated referring to the equation (4), and at step S103 a mirror position value MPOS1 is calculated referring to the equation (6). Then, the state counter SCLM gains an increment (is set to "11") at step S06, and the processing returns to the main routine.

The values calculated referring to the equations (4) and (6) at steps S102 and S103 represent the numbers of steps of the respective stepping motors M1 and M2, and the smallest unit of the movements of the lens 15 and the mirrors 16 and 17 is corresponding to one step of the respective stepping motors M1 and M2. Therefore a lens forward length L1 and a conjugate length L2 obtained by movements of the lens 15 and the mirrors 16 and 17 in accordance with values calculated from the equations (4) and (6) are different from theoretical values calculated by the equations (1) and (2). In this embodiment, focus and magnification are regulated minutely by calculating lens and mirror positions from the values LPOS1 and MPOS1. The processes will be described in detail later.

When the count value of the state counter SCLM is "11", the new magnification ratio MAG2 is compared with the former magnification ratio MAG1 at step S11. When the value MAG2 is larger than the value MAG1, the state counter SCLM gains an increment at step S06 to move the lens 15 before the mirrors 16 and 17, and when the value MAG2 is smaller than the value MAG1, the state counter is set to "14" at step S112 to move the mirrors 16 and 17 before the lens 15. When the value MAG2 is larger than the value MAG1, the lens 15 should be moved in the direction of X', and in this case, the lens 15 is moved before the mirrors 16 and 17. On the contrary, when the value MAG2 is smaller than the value MAG1, the lens 15 should be moved in the direction X, and in this case, the mirror 16 and 17 are moved before the lens 15. This is to avoid a collision between the lens 15, and the mirrors 16 and 17.

When the count value of the state counter SCLM is "12", a subtraction "LPOS1−LPOS2" (LPOS1 is a newly calculated lens position value, and LPOS2 is a former lens position value) is done, and the result is stored in the memory LMSTEP at step S121. Subsequently, a subroutine LMOVE4 for moving the lens 15 according to the value stored in LMSTEP is called at step S122, and the state counter gains an increment (is set to "13") at step S06.

When the count value of the state counter SCLM is "13", it is judged at step S131 whether the register TJOBLM is "0", that is, whether the movement of the lens 15 has been completed. When the result at step S131 is "YES", the magnification ratios MAG2 and MAG1 are compared with each other at step S132. When the value MAG2 is larger than the value MAG1, the state counter gains an increment (is set to "14") at step S06 to proceed to a process of moving the mirrors 16 and 17. When the value MAG2 is smaller than the value MAG1, the state counter is set to "16" at step S133 because the movement of the mirrors 16 and 17 was completed before the movement of the lens 15. Then, the processing returns to the main routine.

When the state counter is "14", a subtraction "MPOS1−MPOS2" (MPOS1 is a newly calculated mirror position value, and MPOS2 is a former mirror position value), and the result is stored in the memory LMSTEP. Subsequently, a subroutine MMOVE4 for moving the mirrors 16 and 17 according to the value stored in the memory LMSTEP is called at step S142, and the state counter gains an increment (is set to "15") at step S06. Referring to the equation (5), the mirror position "x" at a magnification ratio "m" is the same as the mirror position "x" at a magnification ratio "1/m". That is, the mirrors 16 and 17 are not required to move in order to change the magnification from "m" to "1/m". When the magnification is changed from "m" (m>1) to "m'" (m'<1), the mirrors 16 and 17 should be moved by only a travel corresponding with the difference between the conjugate lengths at the magnification ratio "m" and at the magnification ratio "m'" (refer to the mode (d) in FIG. 6). The memory of a former mirror position value enables the mirrors 16 and 17 to move in the shortest way.

When the count value of the state counter SCLM is "15", it is judged at step S151 whether the register TJOBLM is "0", that is, whether the movement of the mirrors 16 and 17 has been completed. When the result at step S151 is "YES", the values MAG2 and MAG1 are compared at step S152. When the value MAG2 is smaller than the value MAG1, the state counter SCLM is set to "12" at step S153 to proceed to a process of moving the lens 15. When the value MAG2 is larger than the value MAG1, in which case the movement of the lens 15 was completed previously, the state counter SCLM gains an increment (is set to "16") at step S06.

When the count value of the state counter SCLM is "16", the logical level of the signal READY is set to "L" at step S161 to indicate the completion of positioning of the lens 15 and the mirrors 16 and 17. The memory MAG1 is renewed with the value MAG2 at step S162, and the memories LPOS2 and MPOS2 are renewed with the values LPOS1 and LPOS1 respectively at step S163 so that these values will be used for a next magnification change. Then, the state counter SCLM is set to "9" at step S164, in which state another magnification ratio is accepted.

The following describes a method for correcting the lens position value LPOS1 and the mirror position value MPOS1 calculated at steps S102 and S103 respectively to achieve focus and a more accurate magnification.

(1) Achieving Focus Prior to Magnification

When an operator sets the magnification of a copying machine varying within a range of 50% to 200% by 1% to a value "m1", a travel of the lens 15 is calculated referring to the equation (3), and the number of steps LPOS1 by which the stepping motor M1 rotates to move the lens 15 is calculated referring to the equation (4). The calculated value LPOS1 is an integer, and the actual travel of the lens 15 (LPOS1 multiplied by travel "a" of the lens 15 per step of the stepping motor M1) is different from a theoretical travel to obtain the magnification ratio "m1". When the set magnification ratio "m1" is 100%, a travel of the lens 15 calculated referring to the equation (4) will be corresponding with not 100% but another magnification ratio "m2" near 100%. The larger the travel "a" of the lens 15 per step of the stepping motor M1 is, the larger the difference between the values "m1" and "m2" becomes. The magnification ratio "m2" may be almost 99.9% or 100.1%.

Therefore after calculating a travel of the lens 15 at a set magnification ratio "m1" referring to the equation (4), a magnification ratio "m2" which is theoretically corresponding with the travel of the lens 15 is figured out. The magnification ratio "m2" must be calculated at least with a digit of 0.1%.

When the calculation of a travel of the lens 15 is prior to the calculation of a travel of the mirrors 16 and 17, a magnification ratio "m2" is calculated from the calculated travel of the lens 15, and the value "m2" is used for calculating a travel of the mirrors 16 and 17 to achieve focus. On the contrary, when the calculation of a travel of the mirrors 16 and 17 is prior to the calculation of a travel of the lens 15, a magnification ratio "m2" is calculated from the calculated travel of the mirrors 16 and 17 (MPOS1 calculated referring to the equation (6) multiplied by travel "a" of the mirrors 16 and 17 per step of the stepping motor M2), and the value "m2" is used for calculating a travel of the lens 15.

The following is a detailed description of the calculations.

(1-a) In a case of moving the mirrors 16 and 17 before the lens 15

At step S102, a value "m1" (0.50, 0.51–1.99, 2.00) transmitted from the master microcomputer as a magnification ratio substitutes for MAG in the equation (4) to calculate a lens position value LPOS1 (an integer). Then, the value LPOS1 is used for calculating a magnification ratio "m2" referring to the following equations (7) through (10):

$$A = 12f - 3D - a \cdot D - 6a \cdot LPOS1 \quad (7)$$

$$B = 500(3D - 6f - a \cdot D - a \cdot LPOS1) \quad (8)$$

$$C = 6 \times 10^6 f \quad (9)$$

$$m2 = \frac{-B + \sqrt{B^2 - A \cdot C}}{A} \times 0.001 \quad (10)$$

$$(0.490 \leq m2 \leq 2.010)$$

Then, in calculating a mirror position value MPOS1 at step S103, the value "m2" substitutes for MAG in the equation (6) so that the mirrors 16 and 17 are moved to a position to achieve focus.

(1-b) In a case of moving the lens 15 before the mirrors 16 and 17

This is a case that the process at step S103 is performed before the process at step S102. A set magnification ratio "m1" substitutes for MAG in the equation (6) to calculate a mirror position value MPOS1 (an integer). Then, the value MPOS1 is used for calculating a magnification ratio "m2" referring to the following equation (11):

$$m2 = \frac{f + a \cdot MPOS1 + \sqrt{(f + a \cdot MPOS1) \times 10^6 - 10^6 \cdot f^2}}{f} \times 0.001 \quad (11)$$

$$(0.490 \leq m2 \leq 2.010)$$

Next, in calculating a lens position value LPOS1 at step S102, the value "m2" substitutes for MAG in the equation (4) so that the lens 15 is moved to a position to achieve focus.

(2) Achieving Magnification Prior to Focus

First, a set magnification ratio "m1" is used for calculating a lens position value LPOS1 referring to the equation (4). In this embodiment, a lens position value is a relative value on the assumption that the value at a magnification ratio of 50% is "0". The calculated lens position value LPOS1 is converted into a lens forward length, and a theoretical conjugate length at the magnification ratio "m1" is further calculated. Since a mirror position value MPOS1 calculated from the equation of (6) is a relative value on the assumption that the value at a magnification ratio of 100% is "0", a correct position of the mirrors 16 and 17 at a magnification ratio cannot be figured out from the calculation referring to the equation (6). Therefore the theoretical conjugate length is used for calculating a mirror position value. In this method, the ratio of the lens forward length and the conjugate length is "1" to "1+m1", and the accurate magnification will be achieved.

When calculating a mirror position value first, the processes should be performed in reverse. Specifically, a conjugate length is calculated, and a theoretical lens forward length is calculated. Then, the theoretical lens forward length is used for calculating a lens position value.

The following is a detailed description of the calculations.

(2-a) In a case of moving the mirrors 16 and 17 before the lens 15

At step S102, a lens position value LPOS1 (an integer) is calculated by substituting a set magnification ratio "m1" for MAG in the equation (4). The lens forward length at a magnification ratio of 50% is calculated to be 3f referring to the equation (1), and a lens forward length "Lm1" at the magnification ratio "m1" can be calculated as follows:

$$Lm1 = 3f - a \cdot LPOS1 \quad (12)$$

Also, a conjugate length Mm1 can be calculated as follows:

$$Mm1 = Lm1 \times (1 + m1) \quad (13)$$

The conjugate length at a magnification ratio of 100% is calculated to be 4f referring to the equation (2), and a travel "Nm1" of the mirrors 16 and 17 can be calculated as follows:

$$Nm1 = (Mm1 - 4f) \times \tfrac{1}{2} \quad (14)$$

At step S103, the calculated value "Nm1" is used for calculating a mirror position value MPOS1 referring to the following equation (15):

$$MPOS1 = Nm1/a \quad (15)$$

Thus, the mirrors 16 and 17 are moved to a position to achieve accurate magnification.

(2-b) In a case of moving the lens 15 before the mirrors 16 and 17

This is a case that the process at step S103 is performed before the process at step S102. First, a mirror position value MPOS1 (an integer) is calculated by substituting a set magnification ratio "m1" for MAG in the equation (6). A conjugate length "M'm1" at the magnification ratio "m1" can be calculated as follows:

$$M'm1 = 4f + a \cdot MPOS1 \quad (16)$$

Then, a theoretical conjugate length "L'm1" at the magnification ratio "m1" is calculated as follows:

$$L'm1 = M'm1/(1 + m1) \quad (17)$$

Further, a travel "N'm1" of the lens 15 can be calculated as follows:

$$N'm1 = 3f - L'm1 \quad (18)$$

Next, at step S102, the calculated value "N'm1" is used for calculating a lens position value LPOS1 referring to the following equation (19):

$$LPOS1 = N'm1/a \quad (19)$$

Thus, the lens 15 is moved to a position to achieve accurate magnification.

FIG. 9 shows the subroutines for starting to move the lens 15, which is performed at steps S13, S66, S74 and S122 of the lens/mirror positioning subroutine. The subroutine LMOVE1 is for moving the lens 15 in the direction of X' to separate the protrusion 21 from the sensor SE1. The subroutine LMOVE2 is for moving the lens 15 in the direction of X to the home position. The subroutine LMOVE3 is for moving the lens 15 in the direction of X' to an initial set position. The subroutine LMOVE4 is for moving the lens 15 in accordance with a value stored in the memory LMSTEP.

At steps S201, S202, S203, S205 and S206, a flag FLARGE is set to "1" or reset to "0". The flag FLARGE is set to "1" when the lens 15 is driven to move to increase magnification, and is reset to "0"

when the lens 15 is driven to move to reduce magnification. The flag FLARGE is used for determining a rotating direction of the stepping motor M1, that is, a change mode of the magnetic excitation phase. At step S204 the moving& direction is checked, and when the value LMSTEP is equal to or more than "0", the flag FLARGE is set to "1" at step S205 for a movement of the lens 15 in the direction of X' to increase magnification. When the value LMSTEP is smaller than "0", the flag FLARGE is reset to "0", and in order to express the number of steps by which the stepping motor M1 is to rotate to move the lens 15 in a positive number, the absolute value of LMSTEP is stored as a value LMSTEP.

At step S208, the register TJOBLM is reset to "0". This is to determine the completion of a movement of the lens 15 depending on the on/off state of the home position sensor SE1. At step S209, the value LMSTEP is stored in the register TJOBLM, and in this case a travel of the lens 15 depends on the value stored in the register TJOBLM.

At step S210, data is sent from the memory LPHASE to the ports $\phi 0$, $\phi 1$, $\phi 2$, and $\phi 3$ to determine the initial lens excitation phase. At step S211, the logical level of the lens motor selection signal is set to "L" to supply an electric current to the stepping motor M1. Since a drive of the stepping motor M1 is realized by interruption of the internal timer of the timer unit 66 with a timer TM2, at step S212 a value TMPPS determining the driving frequencies of the lens 15 and the mirrors 16 and 17 is set in the timer TM2. In this embodiment, both the lens 15 and the mirrors 16 and 17 are driven at a constant speed at an identical frequency. For instance, when the frequency of the clock f CLK is 5 MHz, in order to move the lens 15 and the mirrors 16 and 17 at a speed of 200 pps (200 pulses per second), the value TMPPS should be 25000. In this case, the internal timer is interrupted with pulses of the timer TM2 200 times per second, and the stepping motors M1 and M2 are driven at a frequency of 200 pps.

The interruption of the internal timer with the timer TM2 is allowed at step S213, and the timer TM2 starts counting at step S214. Then, the processing returns to the subroutine at step S3.

FIG. 10 shows the subroutines for starting to move the mirrors 16 and 17, which are performed at steps S04, S41, S54 and S142. The subroutine MMOVE1 is for moving the mirrors 16 and 17 in the direction of X by the maximum travel. The subroutine MMOVE2 is for moving the mirrors 16 and 17 in the direction of X' to the home position. The subroutine MMOVE3 is for moving the mirrors 16 and 17 in the direction of X to an initial set position. The subroutine MMOVE4 is for moving the mirrors 16 and 17 in accordance with a value stored in the memory LMSTEP.

The flag FLARGE which is set to "1" or reset to "0" at steps S301, S302, S303, S305 and S306 during positioning the mirrors 16 and 17 indicates a movement of the mirrors 16 and 17 in the direction of X when it is "1", and indicates a movement in the direction of X' when it is "0". The processes at step S304 and S307 are the same as the processes at steps S204 and S207. When it is judged at step S304 that a value LMSTEP is smaller than "0", the flag is set to "0" at step S306, and the memory LMSTEP is renewed with the absolute value of LMSTEP at step S307.

The processes at step S308 and S309 are to determine whether the completion of a movement of the mirrors 16 and 17 is judged by the home position sensor SE2 or by counting the steps. At step S310, data is set from MPHASE to the ports $\phi 0$, $\phi 1$, $\phi 2$, and $\phi 3$ to determine the initial mirror excitation phase. At step S311, the logical level of the mirror motor selection signal is set to "L" to supply an electric current to the stepping motor M2. Then, the processing goes to steps S212, S213 and S214, and a drive of the stepping motor M2 is realized by interruption of the internal timer with the timer TM2.

FIG. 11 shows a subroutine for interrupting the internal timer with the timer TM2. The processing proceeds to this subroutine only when the timer TM2 has counted up the pulses in the condition that the timer interruption is allowed (refer to step S213).

It is judged at step S401 whether the logical level of the output port OUT0 is "L" or "H". The "L" level of the output port OUT0 indicates that the lens 15 is driven by the stepping motor M1, and the "H" level of the output port OUT0 indicates that the mirrors 16 and 17 are driven by the stepping motor M2. When it is judged at step S401 that the logical level of the output port OUT0 is "L", it is judged at step S402 whether the flag FLARGE is "0". When the result at step S402 is "YES", which indicates a movement in the direction of X, the value LPHASE is shifted by one bit rightward. For instance, suppose that the current LPHASE value is 0011B, the value will change 0011B→1001B→1100B→0110B→0011B successively. Subsequently, the data is sent from the memory LPHASE to the ports $\phi 0$, $\phi 1$, $\phi 2$ and $\phi 3$ at step S405, and the processing goes to step S410. When the result at step S402 is "NO", which indicates a movement in the direction of X', the value LPHASE is shifted by one bit leftward at step S404. For instance, suppose that the current LPHASE value is 0011B, the value will change 0011B→0110B→1100B→1001B→0011B. Then, the processing goes to steps S405 and S410.

When it is judged at step S401 that the logical level of the output port OUT0 is "H", which means that the mirrors 16 and 17 are moving, it is judged at step S406 whether the flag FLARGE is "0". When the result at step S406 is "YES", the value MPHASE is shifted by one bit rightward at step S404. When the result at step S406 is "NO", the value MPHASE is shifted by one bit leftward at step S408. The processes at step S407 and S408 are similar to the processes at steps S403 and S404. Then, the data is sent from the memory MPHASE to the ports $\phi 0$, $\phi 1$, $\phi 2$ and $\phi 3$ at step S409, and the processing goes to step S410.

It is judged at step S410 whether the register TJOBLM is "0". When it is "0", this subroutine is terminated because the stepping motors M1 and M2 are to be stopped depending on the on/off state of the sensors SE1 and SE2. Then, the processing returns to the lens/-mirror positioning subroutine. When the register TJOBLM is not "0" at step S410, at step S411, a subtraction "TJOBLM−1" is done, and the register TJOBLM is renewed with the calculated value. Then, the register TJOBLM is checked at step S412 again. When the register TJOBLM is not "0" at step S412, the processing returns to the lens/mirror positioning subroutine. When the register TJOBLM is "0", which means that the motors M1 and M2 have rotated by the number of steps stored in the memory LMSTEP, the subroutine LMSTOP for stopping the movements of the lens 15 and the mirrors 16 and 17 is called at step S413. Thus, the interruption subroutine is completed.

FIG. 12 shows the subroutine for stopping movements of the lens 15 and the mirrors 16 and 17, which is performed at steps S32, S52, S72 and S413.

First, the timer TM2 stops counting at step S501, and the interruption of the internal timer with the timer TM2 is inhibited at step S502. Then the logical levels of the output ports OUT1 and OUT2 are set to "H" at step S503 to cut off the electric currents to the stepping motors M1 and M2, and the processing returns to the main routine.

Other Embodiments: FIGS. 14 through 19

FIG. 14 shows a second embodiment of the present invention, in which the lens 15 and the mirrors 16 and 17 are driven by a single stepping motor M3. The gears 24 and 34 for transmitting rotation to the wires 28 and 38 are engaged with an output gear (not shown) of the stepping motor M3, and an electromagnetic clutch is provided for each of the gears 24 and 34. The electromagnetic clutch of the gear 24 is turned on to move the lens 15, and the electromagnetic clutch of the gear 34 is turned on to move the mirrors 16 and 17. Regarding its electric circuit, the stepping motor 3 is always supplied with an electric current, and signals sent from the output ports OUT0 and OUT1 (see FIG. 3) should be signals for commanding turning on and off the electromagnetic clutches.

In the construction, there is a fear that the lens 15 and the mirrors 16 and 17 may move due to vibration when the electromagnetic clutches are turned off. In order to suppress the vibration at the time of turning off the electromagnetic clutches, preferably a brake mechanism for preventing idle rotation of the electromagnetic clutches is installed in the clutches. Instead of the electromagnetic clutches, a combination of a solenoid and a lever may be applied for switching the drive power. Alternatively, a kick-spring method may be adopted in connecting the gears 24 and 34 to the output gear of the stepping motor M3.

FIGS. 15 and 16 show a third embodiment of the present invention, in which the stepping motor M1 is disposed on a support 40 of the lens 15. The support 40 has three rollers 41, and since the rollers 41 are engaged with a guide rail 49 fixed in the copying machine, the support 40 is movable in the directions indicated by the arrows X and X'. An output gear 23 of the stepping motor M1 is engaged with a gear 46 mounted rotatably on the support 40, and further mounted on the support 40 are a pulley 47 which is coaxial with the gear 46 and idle pulleys 48. A wire 44 whose ends are fixed is laid among the pulley 47 and the idle pulleys 48. An electric current is supplied to the stepping motor M1 through a flexible cord 42. With forward or reverse rotation of the stepping motor M1, the gear 46 and the pulley 47 rotate together forward or in reverse, and tension of the wire 44 and friction between the wire 44 and the pulley 47 are converted into power to move the support 40 along the guide rail 49 in the direction X or X'. Thus, the lens 15 moves in the direction X or X'.

FIG. 17 shows a fourth embodiment of the present invention, in which a pinion 52 mounted on the support 40 coaxially with a gear 51 is engaged with a rack 50 fixed in the copying machine. The gear 51, which is rotatably mounted on the support 40, is engaged with the output gear 23 of the stepping motor M1. A pitching 53 mounted on the support 40 coaxially with the pinion 52 and guide rollers 54 are pressed against a rail portion 50*a* of the rack 50, whereby the support 40 is movable in the directions of X and X' along the rail portion 50*a*. With forward or reverse rotation of the stepping motor M1, the gear 51 and the pinion 52 rotate together forward or in reverse, and the pinion 52 moves along the rack 50, followed by a movement of the support 40 along the rail portion 50*a*. Thus, the lens 15 moves in the direction of X or X' along the rail portion 50*a*.

FIG. 18 shows a fifth embodiment of the present invention, in which a driving roller 57 and guide rollers 58 which are mounted on the support 40 are engaged with a guide rail 55 fixed in the copying machine. The guide rollers 58 are rotatably mounted on the support 40, and the driving roller 57 is coaxial with a gear 56 which is rotatably mounted on the support 40. The gear 56 is engaged with the output gear 23 of the stepping motor M1. The roller 57 is made of a material whose friction coefficient is large so that friction between the roller 57 and the guide rail 55 will be large. With forward or reverse rotation of the stepping motor M1, the roller 57 rotates together with the gear 56 forward or in reverse and moves along the guide rail 55, whereby the support 40 supporting the lens 15 moves in the direction X or X' along the guide rail 55. Preferably, the guide rollers 58 have a large friction coefficient and are pressed against the guide rail 55 by an elastic member.

FIG. 19 shows a sixth embodiment of the present invention, in which a mesh rope 60 is used as a drive force transmitter. The rope 60, whose both ends are fixed in the copying machine, is laid among a driving pulley 62 mounted on the support 40 coaxially with a gear 61 and idle pulleys 63 rotatably mounted on the support 40. The gear 61 is rotatably mounted on the support 40 and engaged with the output gear 23 of the stepping motor M1. By applying appropriate tension to the rope 60, the support 40 supporting the lens 15 moves in the directions of X and X' with forward or reverse rotation of the stepping motor M1 without using a rail.

As a modification of the sixth embodiment, it is possible that a chain, a timing belt or a sprocket wheel is used as a drive force transmitter instead of a combination of the mesh rope 60 and the driving pulley 62. Regarding the third embodiment shown in FIGS. 15 and 16, if the wire 44 is supplied with sufficient tension, the guide rail 49 will be unnecessary.

Further, it is noted that various modifications of the drive mechanism as described above can be applied to the drive mechanism for moving the mirrors 16 and 17.

Although the present invention has been described in connection with the embodiment above, it is to be noted that various changes and modifications are apparent to those who are skilled in the art. Such changes and modifications are to be understood as included within the scope of the present invention defined by the appended claims, unless being separated therefrom.

What is claimed is:

1. An electrophotographic machine for projecting an image of an original on a photosensitive medium at a predetermined magnification ratio, comprising:
   - a reflection member for forming an optical projection path to project an original image on a photosensitive medium, the reflection member being movable to change the length of the optical projection path;
   - a uni-focus projection lens movable in the optical projection path;
   - inputting means for inputting the actual focal length of the uni-focus projection lens;
   - setting means for setting a magnification ratio;
   - first drive means for moving the projection lens;

second drive means for moving the reflection member; and control means for independently moving the first drive means and the second drive means according to a set magnification ratio and the input focal length of the projection lens.

2. An electrophotographic machine as claimed in claim 1, further comprising:

first detection means for detecting that the projection lens is at its home position; and second detection means for detecting that the reflection member is at its home position.

3. An electrophotographic machine as claimed in claim 2, wherein a switch member is used as said first detection means and as said second detection means.

4. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for calculating moving amounts of the projection lens and the reflection member according to a set magnification ratio and the focal length of the projection lens and for independently controlling the first drive means and the second drive means according to the calculated moving amounts of the projection lens and the reflection member.

5. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the first drive means to move the projection lens according to a set magnification ratio, and then controlling the second drive means to move the reflection member according to the movement of the projection lens, so as to avoid collision of the projection lens and the reflection member.

6. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the second drive means to move the reflection member according to a set magnification ratio, and then controlling the first drive means to move the projection lens according to the movement of the reflection member, so as to avoid collision of the projection lens and the reflection member.

7. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the first drive means to move the projection lens according to a set magnification ratio and the focal length of the projection lens, and then controlling the second drive means to move the reflection member according to the movement of the projection lens, so as to avoid collision of the projection lens and the reflection member.

8. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member; and control means for controlling, at first, the second drive means to move the reflection member according to a set magnification ratio and the focal length of the projection lens, and then controlling the first drive means to move the projection lens according to the movement of the reflection member, so as to avoid collision of the projection lens and the reflection member.

9. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the first stepping motor to rotate, in order to move the projection lens, by a calculated number of steps in accordance with a set first magnification ratio and the focal length of the projection lens;

calculation means for calculating a second magnification ratio according to the travel of the projection lens controlled by the first control means; and second control means for controlling the second stepping motor to rotate, in order to move the reflection member, by a calculated number of steps in accordance with the second magnification ratio.

10. An electrophotographic machine as claimed in claim 9, in which the first stepping motor is identical to the second stepping motor to move either the projection lens or the reflection member by switching a drive force transmission mechanism.

11. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the second stepping motor to rotate, in order to move the reflection member, by a calculated number of steps in accordance with a set first magnification ratio and the focal length of the projection lens;

calculation means for calculating a second magnification ratio according to the travel of the reflection member controlled by the first control means; and second control means for controlling the first stepping motor to rotate, in order to move the projection lens, by a calculated number of steps in accordance with the second magnification ratio.

12. An electrophotographic machine as claimed in claim 11, in which the first stepping motor is identical to the second stepping motor to move either the projection lens or the reflection member by switching a drive force transmission mechanism.

13. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the first stepping motor to rotate, in order to move the projection lens, by a calculated number of steps in accordance with a set magnification ratio and the focal length of the projection lens;

calculation means for calculating the theoretical conjugate length at the set magnification ratio from the travel of the projection lens controlled by the first control means; and second control means for controlling the second stepping motor to rotate, in order to move the reflection member, by a calculated number of steps in accordance with the calculated theoretical conjugate length.

14. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a first stepping motor for moving the projection lens;

a second stepping motor for moving the reflection member;

first control means for controlling the second stepping motor to rotate, in order to move the reflection member, by a calculated number of steps in accordance with a set magnification ratio and the focal length of the projection lens;

calculation means for calculating the theoretical lens forward length at the set magnification ratio from the travel of the reflection member controlled by the first control means; and second control means for controlling the first stepping motor to rotate, in order to move the projection lens, by a calculated number of steps in accordance with the calculated theoretical lens forward length.

15. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a stepping motor for moving selectively the projection lens and the reflection member;

first control means for controlling the stepping motor to rotate, in order to move the projection lens, by a calculated number of steps in accordance with a set magnification ratio and the focal length of the projection lens;

calculation means for calculating the theoretical conjugate length at the set magnification ratio from the travel of the projection lens controlled by the first control means; and second control means for controlling the stepping motor to rotate, in order to move the reflection member, by a calculated number of steps in accordance with the calculated theoretical conjugate length.

16. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

a stepping motor for moving selectively the projection lens and the reflection member;

first control means for controlling the stepping motor to rotate, in order to move the reflection member, by a calculated number of steps in accordance with a set magnification ratio and the focal length of the projection lens;

calculation means for calculating the theoretical lens forward length at the set magnification ratio from the travel of the reflection member controlled by the first control means; and second control means for controlling the stepping motor to rotate, in order to move the projection lens, by a calculated number of steps in accordance with the calculated theoretical lens forward length.

17. An electrophotographic machine for projecting an image of an original on a photosensitive medium at a predetermined magnification ratio, comprising:

a reflection member for forming an optical projection path to project an original image on a photosensitive medium, the reflection member being movable to change the length of the optical projection path;

a uni-focus projection lens movable in the optical projection path;

first drive means for moving the projection lens;

second drive means for moving the reflection member;

setting means for setting a magnification ratio; and control means for controlling, when the magnification is changed from a reduced magnification ratio to an expanded magnification ratio and from an expanded magnification ratio to a reduced magnification ratio, the second drive means to directly move the reflection member to a position corresponding to a newly-set magnification ratio without passing a home position for a full-size magnification.

* * * * *